(12) United States Patent
Zappella

(10) Patent No.: US 10,909,604 B1
(45) Date of Patent: Feb. 2, 2021

(54) ARTIFICIAL INTELLIGENCE SYSTEM FOR AUTOMATED SELECTION AND PRESENTATION OF INFORMATIONAL CONTENT

(71) Applicant: Amazon Technologies, Inc., Seattle, WA (US)

(72) Inventor: Giovanni Zappella, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 252 days.

(21) Appl. No.: 15/914,923

(22) Filed: Mar. 7, 2018

(51) Int. Cl.
*G06Q 30/02* (2012.01)
*G06Q 30/06* (2012.01)
*G06Q 99/00* (2006.01)
*G06N 20/00* (2019.01)
*G06K 9/62* (2006.01)

(52) U.S. Cl.
CPC ....... *G06Q 30/0631* (2013.01); *G06K 9/6277* (2013.01); *G06N 20/00* (2019.01); *G06Q 30/0253* (2013.01); *G06Q 30/0256* (2013.01); *G06Q 30/0623* (2013.01); *G06Q 30/0641* (2013.01); *G06Q 99/00* (2013.01)

(58) Field of Classification Search
None
See application file for complete search history.

(56) References Cited

U.S. PATENT DOCUMENTS

| | | | |
|---|---|---|---|
| 6,169,986 B1 | 1/2001 | Bowman et al. | |
| 6,266,649 B1 | 7/2001 | Linden et al. | |
| 6,772,150 B1 | 8/2004 | Whitman et al. | |
| 6,782,370 B1 | 8/2004 | Stack | |
| 7,165,080 B2 | 1/2007 | Kotcheff et al. | |
| 7,295,995 B1 | 11/2007 | York et al. | |
| 7,542,951 B1 * | 6/2009 | Chakrabarti | G06N 20/00 706/45 |
| 7,559,046 B1 * | 7/2009 | Datta | G06F 17/5054 716/134 |
| 7,584,159 B1 | 9/2009 | Chakrabarti et al. | |
| 7,590,562 B2 | 9/2009 | Stoppelman | |

(Continued)

FOREIGN PATENT DOCUMENTS

| | | | | |
|---|---|---|---|---|
| WO | WO-2007147166 A3 * | 12/2008 | | G06N 5/02 |
| WO | WO-2012091731 A2 * | 7/2012 | | H04N 21/812 |

OTHER PUBLICATIONS

Frias-Martinez, E., et al., "Survey of Data Mining Approaches to User Modeling for Adaptive Hypermedia," IEEE Transactions on Systems, Man, and Cybernetics—Part C:Applications and Reviews, vol. 36, No. 6, pp. 734-749, Nov. 2006. (Year: 2006).*

(Continued)

*Primary Examiner* — Nicholas D Rosen
(74) *Attorney, Agent, or Firm* — Robert C. Kowert; Kowert, Hood, Munyon, Rankin & Goetzel, P.C.

(57) ABSTRACT

A set of informational content elements pertaining to an item for presentation to one or more potential item consumers is identified at an artificial intelligence service. A plurality of optimization iterations are implemented. In a particular iteration, a set of content elements to be presented to a target audience in accordance with a set of presentation constraints indicated by a content source associated with the item is identified using a machine learning model, and metrics indicating the effectiveness of the content elements are analyzed.

20 Claims, 12 Drawing Sheets

(56) References Cited

U.S. PATENT DOCUMENTS

| | | | |
|---|---|---|---|
| 7,668,821 | B1 | 2/2010 | Donsbach et al. |
| 7,756,855 | B2 | 7/2010 | Ismalon |
| 7,783,528 | B2 | 8/2010 | Musgrove et al. |
| 7,809,601 | B2 | 10/2010 | Shaya et al. |
| 7,890,526 | B1 | 2/2011 | Brewer et al. |
| 7,908,183 | B2 | 3/2011 | Jacobi et al. |
| 8,019,748 | B1 | 9/2011 | Wu et al. |
| 8,065,316 | B1 | 11/2011 | Baker et al. |
| 8,090,621 | B1 | 7/2012 | Chakrabarti et al. |
| 8,301,623 | B2 | 10/2012 | Chakrabarti et al. |
| 8,452,797 | B1 | 5/2013 | Paleja et al. |
| 8,468,164 | B1 | 6/2013 | Paleja et al. |
| 8,510,247 | B1 | 8/2013 | Kane, Jr. et al. |
| 8,577,911 | B1 | 11/2013 | Stepinski et al. |
| 8,983,193 | B1 * | 3/2015 | Ordonez Roman .......................... G06K 9/6263 382/190 |
| 9,454,636 | B1 * | 9/2016 | Subramaniam ..... G06F 17/5022 |
| 9,569,728 | B2 * | 2/2017 | Cohen ...................... G06N 5/02 |
| 10,255,249 | B1 * | 4/2019 | Yu .......................... G06F 17/212 |
| 10,341,701 | B2 * | 7/2019 | Hirsch ................ H04L 65/1089 |
| 10,545,640 | B1 | 1/2020 | Yu et al. |
| 2002/0002502 | A1 | 1/2002 | Maes et al. |
| 2002/0010625 | A1 | 1/2002 | Smith et al. |
| 2002/0161664 | A1 | 10/2002 | Shaya et al. |
| 2007/0204308 | A1 | 8/2007 | Nicholas et al. |
| 2007/0282811 | A1 | 12/2007 | Musgrove |
| 2008/0140643 | A1 | 6/2008 | Ismalon |
| 2010/0146012 | A1 | 6/2010 | Beaudreau et al. |
| 2011/0082824 | A1 * | 4/2011 | Allison ................ G06Q 10/063 706/20 |
| 2011/0213655 | A1 * | 9/2011 | Henkin .................. G06Q 30/00 705/14.49 |
| 2013/0073430 | A1 | 3/2013 | Gallen et al. |
| 2015/0242492 | A1 | 8/2015 | Bhatt et al. |
| 2016/0140447 | A1 * | 5/2016 | Cohen ...................... G06N 5/02 706/52 |
| 2016/0253392 | A1 | 9/2016 | Allen et al. |
| 2016/0292343 | A1 * | 10/2016 | Subramaniam ..... G06F 17/5022 |
| 2017/0091319 | A1 | 3/2017 | Legrand et al. |
| 2017/0109807 | A1 | 4/2017 | Krishnan et al. |
| 2017/0161640 | A1 * | 6/2017 | Shamir .................. G06N 20/00 |
| 2017/0171580 | A1 * | 6/2017 | Hirsch ................. H04N 21/252 |
| 2018/0107645 | A1 | 4/2018 | Payne et al. |
| 2018/0276718 | A1 * | 9/2018 | Thomas ............. G06Q 30/0243 |
| 2019/0130285 | A1 | 5/2019 | Snyder et al. |

OTHER PUBLICATIONS

Blei, David M., Department of Computer Science, Princeton University, "Probabilistic Topic Models," pp. 1-155, Jun. 26, 2012. ( Year: 2012).*
Park, E., et al., "Predictive Modeling in a Polyhedral Optimization Space," International Journal of Parallel Programming, 41.5, pp. 704-750, Oct. 2013. (Year: 2013).*
Yaroslav Ganin and Victor Lempitsky, "Unsupervised Domain Adaptation by Backpropagation," Proceedings of the 32nd International Conference on Machine Learning, Lille, France, 2015. JMLR: W&CP vol. 10. Copyright 2015 by the author(s), pp. 1-10. (Year: 2015).*
Mohit Iyyer, Anupam Guha, Snigdha Chaturvedi, Jordan Boyd-Graber, and Hal Daume III, "Feuding Families and Former Friends: Unsupervised Learning for Dynamic Fictional Relationships," 2016, pp. 1-11. (Year: 2016).*
Zachary C. Lipton, et al., "Generative Concatenative Nets Jointly Learn to Write and Classify Reviews", arXivPrepring arXiv: 1511. 03683v5, Apr. 7, 2016, pp. 1-11. (Year: 2016).*
Wikipedia, "Multi-armed bandit", Retreived from URL: https://en.wikipedia.org/Multi-armed_bandit on Jul. 11, 2017, pp. 1-13. ( Year: 2017).*

U.S. Appl. No. 15/861,496, filed Jan. 3, 2018, Prashant Verma et al.
AWS, "Amazon Machine Learning Developer Guide Version Latest", Copyright 2017 Amazon Web Services, pp. 1-146.
Karol Gregor, et al., "DRAW: A Recurrent Neural Network for Image Generation", Proceedings of the 32nd nlemalional Conference on Machine Learning; JMLR: W & CP, vol. 37, pp. 1-10, May 20, 2015.
Diederik R Kingma and Jimmy Lei Ba, "ADAM: A Method for Stochastic Optimization," Published as a conference paper at ICLR 2015, Jul. 23, 2015, pp. 1-15.
David Bamman, Ted Underwood and Noah A. Smith, "A Bayesian Mixed Effects Model of Literary Character," Proceedings of the 52nd Annual Meeting of the Association for Computational Linguistics, pp. 370-379, Baltimore, Maryland, USA, Jun. 23-25, 2014. c2014 Association for Computational Linguistics.
David Bamman, Brendan O'Connor and Noah A. Smith, "Learning Latent Personas of Film Characters," Proceedings of the 51st Annual Meeting of the Association for Computational Linguistics, pp. 352-361, Sofia, Bulgaria, Aug. 1-9, 2013. c2013 Association for Computational Linguistics.
David Bamman and Noah A. Smith, "Unsupervised Discovery of Biographical Structure from Text," http://dumps.wikimedia.org/enwiki/20140102/enwiki-20140102-pages-articles.xml.bz2, 2014, pp. 1-13.
Micha Elsner, "Character-based Kernels for Novelistic Plot Structure," Proceedings of the 13th Conference of the European Chapter of the Association for Computational Linguistics, pp. 634-644, Avignon, France, Apr. 23-27, 2012. c2012 Association for Computational Linguistics.
Jeffrey Pennington, Richard Socher and Christopher D. Manning, "GloVe: Global Vectors for Word Representation," Oct. 25, 2014, pp. 1-12.
Yoav Goldberg, "A Primer on Neural Network Models for Natural Language Processing," Draft as of Oct. 5, 2015, Journal of Artificial Intelligence Research 57 (2016) pp. 345-420.
Diego Marcheggiani and Ivan Titov, "Discrete-State Variational Autoencoders for Joint Discovery and Factorization of Relations," Transactions of the Association for Computational Linguistics, vol. 4, pp. 231-244, 2016. Action Editor: Sebastian Riedel Submission batch: Oct. 2015; Revision batch: Feb. 2016; Published Jun. 2016. 2016 Association for Computational Linguistics. Distributed under a CC-BY 4.0 license.
U.S. Appl. No. 14/581,555, filed Dec. 23, 2014, Wainwright Gregory Siady Yu.
U.S. Appl. No. 14/581,546, filed Dec. 23, 2014, Wainwright Gregory Siady Yu.
"Who are you shopping for?", downloaded from https://www.amazon.com/gp/gifl-finder?ageGroup=adult-neutral&showBubbles=true on Aug. 13, 2017, pp. 1-6.
U.S. Appl. No. 15/474,992, filed Mar. 30, 2017, Szarvas, et al.
U.S. Appl. No. 15/688,681, filed Aug. 28, 2017, Weiwei Cheng.
Zachary C. Lipton, et al., "Generative Concatenative Nets Jointly Learn to Write and Classify Reviews", arXiv:1511.03683v5, dated Apr. 7, 2016, pp. 1-11.
Yaroslav Ganin, et al., "Unsupervised Domain Adaptation by Backpropagation," Proceedings of the 32nd International Conference on Machine Learning, Lille, France, 2015. JMLR: W&CP vol. 37. Copyright 2015 by the author(s), pp. 1-10.
Mohit Iyyer et al, "Feuding Families and Former Friends: Unsupervised Learning for Dynamic Fictional Relationships," 2016, pp. 1-11.
David M. Blei, Department of Computer Science Princeton University, "Probabilistic Topic Models," Jun. 26, 2012, pp. 1-155.
Smekens, "Clarify Purpose versus Point of View versus Perspective," 2015 (Year: 2015).
Sariel Har-Peled, et al., "Constraint Classification for Multiclass Classification and Ranking," International Conference on Algorithmic Learning Theory, Nov. 8, 2002, pp. 1-8.
Ben Krause, et al., "Multiplicative LSTM for sequence modelling," Oct. 25, 2016, Workshop track—ICLR 2017, pp. 1-13.
Gerald Tesauro, "Connectionist Learning of Expert Preferences by Comparison Training," IBM Thomas J. Watson Research Center, 1988, pp. 99-106.

(56) References Cited

OTHER PUBLICATIONS

Alec Radford, et al. "Learning to Generate Reviews and Discovering Sentiment," OpenAI, San Francisco, CA, Apr. 6, 2017, pp. 1-9.
D. Sculley, et al., "Combined Regression and Ranking," ACM, KDD '10, Jul. 25-28, 2010, Washington, DC, pp. 1-9.
Eyke Hullermeier, et al., "Label ranking by learning pairwise preferences," Artificial Intelligence 172 (2008), pp. 1897-1916.
U.S. Appl. No. 15/831,008, filed Dec. 4, 2017, Gyuri Szarvas et al.
U.S. Appl. No. 15/914,923, filed Mar. 7, 2018, Giovanni Zappella.
U.S. Appl. No. 15/873,684, filed Jan. 17, 2018, Valentin Flunkert et al.

* cited by examiner

ARTIFICIAL INTELLIGENCE SYSTEM FOR AUTOMATED SELECTION AND PRESENTATION OF INFORMATIONAL CONTENT

BACKGROUND

Many content providers, such as e-retail organizations or libraries which sell, lend or stream content items such as books, periodicals, motion pictures and the like, may have large inventories comprising millions of items. In order to attract consumers for the content items, a number of interfaces may be used to present collateral information about the items—e.g., excerpts from reviews may be presented, images of book covers or authors may be presented, and so on. Furthermore, such informational content may be presented in a number of different contexts—e.g., as part of a recommendation, in response to a search request, in an advertisement, and so on.

The items being offered to consumers by a large e-retail organization may have been created or generated by numerous types of vendors or item producers. Some items may have been produced by experienced vendors or publishers, who have substantial expertise on the types of informational content which is most likely to attract large numbers of consumers. Such experienced item producers may often be able to provide effective guidance to the e-retail organization regarding the types of informational content to be presented in various contexts.

For many inventory items such as self-published books or self-released music, the producers of the items may not have much expertise regarding presentation of informational content. In the case of books, for example, the design of a particular book cover or the specific terms in which the book is described may have a significant impact on the sales of the book, and the book's author may not be aware of the importance of the informational content presentation choices, or how best to generate effective informational content. The problem of selecting informational content for presentation to potential consumers may be even more challenging when the content that can be presented for an item is largely subjective in nature (as in the case of book descriptions, cover designs and the like) as opposed to more objective information such as size, color and so on (which may apply to items like clothing, luggage, electronics items, and so on).

Figure 1:
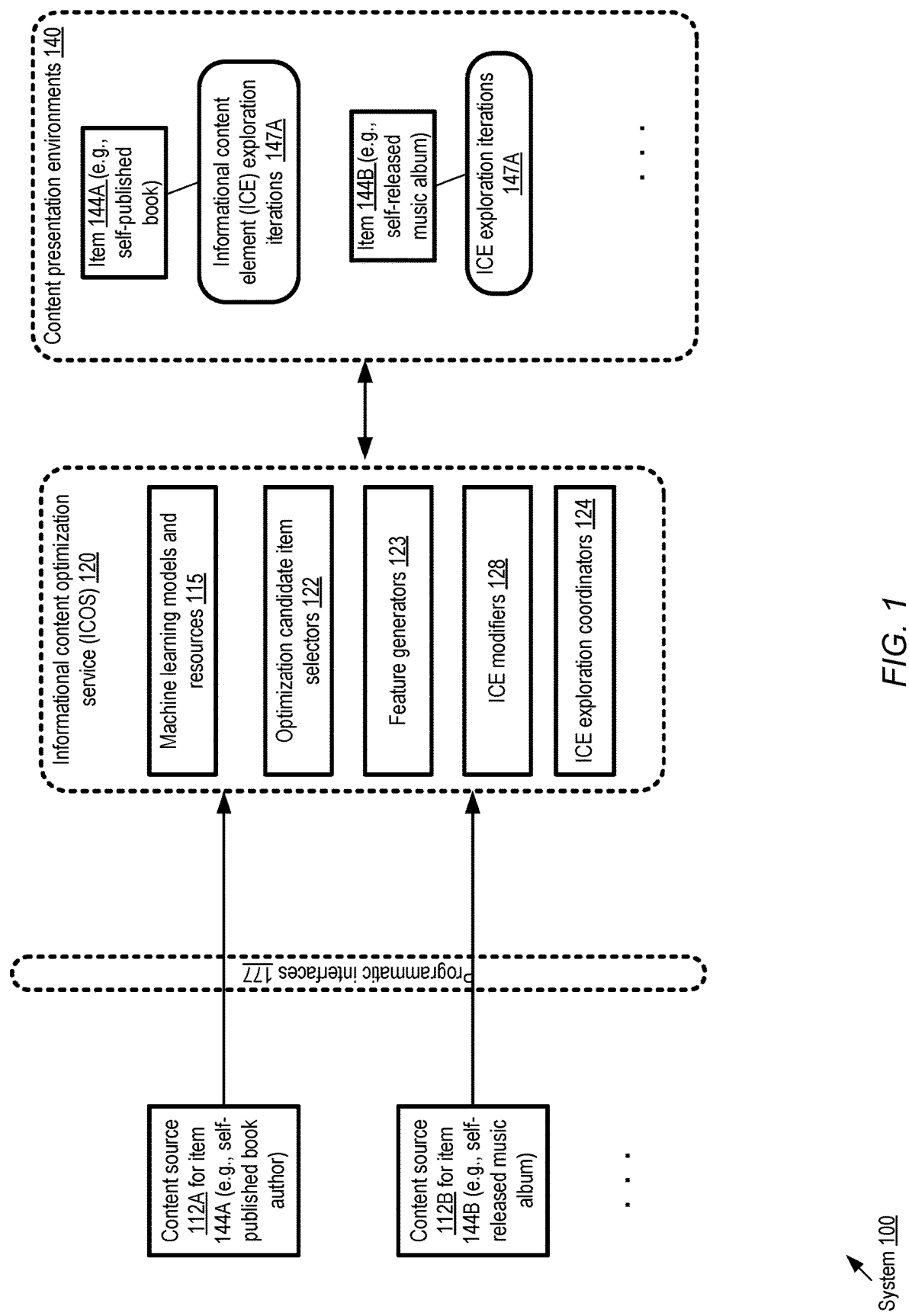
FIG. 1 illustrates an example system environment in which machine-learning based techniques for optimizing the presentation of informational content for at least some classes of items of an inventory may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for optimizing the presentation of informational content for at least some types of items (such as alternative author-provided book covers or book descriptions) of an inventory, which may be offered to potential item consumers (e.g., at an e-retailer), are described. The term "informational content element" or ICE associated with an inventory item may be used in various embodiments to refer to an artifact, such as an image, a video, a few phrases or a paragraph of text, etc. which in some way describes the item or conveys some information pertaining to the item, in a way that may be useful to potential consumers of the item in deciding whether they wish to consume (e.g., purchase or lease) the item. In at least some embodiments, one or more of the techniques described herein may be employed at a large-scale content provider such as an e-retailer which has an inventory comprising millions of items, where the producers of at least some of the items may have relatively limited expertise regarding the effectiveness of different types of content elements with respect to increasing sales or other metrics of interest, and where at least some types of informational content that can be provided for such items is somewhat subjective. Such item producers may be referred to as the "long tail" of the distribution of item producers in some embodiments. Although such item producers may have limited experience and/or resources with respect to promoting their own items, the e-retailing organization (or some affiliated organization) may in some embodiments have access to substantial artificial intelligence or machine learning resources, as well as an extensive collection of data regarding the effectiveness of various types if information that has been presented to potential consumers in the past. As such, various types of experimentation and optimization techniques may be employed at the e-retailer to help at least some such less-experienced item producers achieve their business objectives.

In some embodiments, a network-accessible service capable of implementing such optimization techniques may be able to identify or select at least some items which are candidates for optimization of ICE presentation, and inform the item owners or authors accordingly. Such a service may be referred to in various embodiments as an informational content optimization service (ICOS). The owner or author of a given item may, for example, interact with such a service via one or more programmatic interfaces (such as a web-based console, a graphical user interface, a command line tool or a set of application programming interfaces (APIs)), and an indication that the item is a candidate for ICE optimization may be provided via such an interface. An entity authorized to provide informational content about an item (such as the producer, creator or author) of an item may be referred to as a "content source" associated with the item, and/or as an "item owner" in various embodiments. In one embodiment, the service may make a determination, after receiving an indication of a particular item and/or based on an analysis of previous interactions (if any such interactions have occurred) with the owner/author as to whether it is advisable to obtain a set of ICE examples for experimentation and optimization using a machine learning algorithm in an online mode, and may inform the owner/author accordingly. In some embodiments, by default, an item owner who wishes to include an item within a network-accessible inventory may be obligated or required to provide a set of alternative ICEs of one or more categories, e.g., as part of a contract or business agreement. In some embodiments, an explicit indication that an item is a candidate for ICE optimization may not necessarily be provided to a content source; instead, for example, an item's owner may (at the owner's initiative) provide various ICE choices which can be used for optimization without any prompting from an ICOS. In one embodiment, an analysis of the interactions of potential consumers of an item for which a particular set of one or more ICEs has been presented (or the lack of sufficient interactions with potential consumers) may help a service make a determination as to whether more ICE alternatives should be considered—e.g., a request to supply additional ICEs may be sent to a content source if a current set of ICEs fails to provide the desired business results. In some embodiments, a network-accessible service may enable item owners to query the service to determine whether their items should be considered candidates for ICE optimization.

In various embodiments, a content source may provide a plurality of informational content items pertaining to a particular item to an informational content optimization service designed to optimize presentation of such content, together with one or more presentation constraints. For example, a self-published book's author may indicate that a description of the book must include the phrase "modern-day romance", or that the cover of the book should show at least some version of an image of a house. Such constraints, which indicate portions of content that are to be included in one or more ICE presentations, may be referred to as content portion inclusion constraints. Other constraint types may include, for example, content modification constraints (indicating which particular portions of an ICE can be modified by the ICE optimization service), content exclusion constraints (indicating, for example, that some types of words or images should not be included in an ICE presentation) and so on. In some embodiments, presentation constraints may not necessarily be provided or indicated by a content source.

In some embodiments, several different examples of ICEs of at least one category (where the categories may include, among others, cover images, descriptions, titles, pre-publication review extracts, example text extracts, and the like) may be provided by the content source to an ICOS. The ICOS may generate, corresponding to individual ones of the example ICEs, a respective set of input features for a machine learning model in various embodiments—e.g., a text description may be converted to a feature vector using a word embedding generation algorithm, or an image which may be used for a book cover may be transformed into a feature vector. The ICOS may perform a plurality of optimization iterations using the machine learning model. In at least some embodiments, the machine learning model may be employed in an online mode (e.g., a mode in which learning/training occurs in an ongoing or continuous manner as the model is used on previously unseen input, without a distinct batch-oriented training phase). A particular optimization iteration of the model may comprise, for example, determining, from the plurality of ICEs in accordance with the applicable presentation constraints, a particular set of ICEs to be presented to a target audience in a particular presentation context. If, for example, there are two examples of a particular ICE category such as a book description paragraph available, one of the examples may be included in the particular set, and the other example may be excluded. In various embodiments, the particular optimization iteration may further comprise analyzing one or more metrics associated with the presentation of the particular set of ICEs (such as web-link clicks, purchases, and the like) to the audience in the particular context, and adjusting the ICE set if needed for the next iteration. In effect, in some embodiments, when the model is run in online mode, the utility or impact of a particular set of ICEs may be measured as soon as some interactions with potential consumers of the item are detected, and adjustments to the ICEs being presented (to the same audience, and/or to other audiences) may be made fairly rapidly based on the analysis of such interactions. Such a machine learning methodology may be referred to as an exploration-exploitation methodology in some embodiments.

For at least some of the items, multiple presentation contexts may be usable to display or indicate the ICEs in various embodiments—e.g., one or more recommendation-related interfaces may be available, various types of search result interfaces may be implemented, an overview or item summary web page may be generated for each item, a details page may be generated, and so on. In the e-retail environment, the various presentation contexts may, for example, be encountered during a navigation of a web site which can potentially conclude with the purchase (or borrowing/leasing) of the items. In at least some embodiments, respective exploration-exploitation algorithms may be run for individual ones of the presentation contexts (e.g., sequentially or in parallel).

At a high level, the content presentation optimization methodology may be summarized as follows for at least some embodiments. For a given item of an inventory for which multiple ICE examples of one or more categories have been provided by a content source, a baseline set of one or more informational content elements may initially be selected for presentation in at least some presentation context. A number of different techniques may be used to identify the baseline set in different embodiments—e.g., a machine learning model may be trained to predict an effective combination of ICE features using records of earlier consumer interactions with similar ICEs or similar items, a random collection of ICEs may be selected from among the available ICEs, and so on. After the baseline set has been identified, experiments may be carried out using variants of the baseline set in an ongoing manner, e.g., until some set of desired optimization objectives have been achieved using a machine learning model operating in an online or continuous learning mode, or until some optimization termination criteria are met. The termination criteria may, for example, include determining that the marginal improvements in effectiveness or utility being achieved by the variants has plateaued, that the overall consumption rate of the set of items for which ICE presentation is being optimized has fallen below some threshold which renders further optimizations inessential, and so on. In effect, the benefits of presenting various individual versions or variants of ICEs may be learned dynamically in an ongoing process, enabling the provider of the inventory to adjust to potentially changing trends in consumer behavior in at least some embodiments.

Both positive and negative feedback generated by potential or actual item consumers to the ICE combinations being explored may be used to make adjustments to the presented content in at least some embodiments. For example, a negative review submitted by a purchaser, or a record of a post-purchase return transaction of an item (which may include reasons for the return), may be analyzed using a natural language understanding model, and the ICE combination or presentation may be adjusted accordingly in some embodiments. The negative review or return reason may indicate, for example, that some portion of the ICE presentation in some presentation context was misleading or was considered an example of over-promising, and changes to remove the apparently misleading or over-promising portions of the content may be made by the ICOS. Similarly, positive reviews may indicate correlations between presented ICEs and what the consumers liked about an item, and such positive feedback may be used to further emphasize the liked aspects in ICE combinations used in the future in some embodiments. For some items, the optimization iterations may continue indefinitely, e.g., as long as the item is included in the inventory being offered by an e-retailer, or as long as the item owner does not request termination.

In at least some embodiments, the ICOS at which the machine learning-based optimizations are being performed may generate modified versions of at least some of the ICEs provided by a content source—e.g., by changing the arrangement of words or images in an ICE slightly, as long as the constraints (if any) provided by the content source are not violated. Modifications to the original ICEs may also be performed using machine learning models in some embodiments. The exploration of the presentation space and the associated optimization may be performed in some embodiments using so-called "bandit" machine learning models and algorithms, such as a contextual bandit algorithm, a multi-arm bandit algorithm, or other similar state-dependent adaptive trial algorithms. In a contextual bandit algorithm which may be employed in one embodiment, a multi-dimensional feature vector called a context vector may be generated from the available ICE choices. When making a particular choice for ICE recommendations in a given optimization iteration, the context vector and the rewards/losses corresponding to past choices may be analyzed, with the tradeoffs between exploration (the extent of changes made to the previously-presented sets of ICEs) and exploitation (maximization of rewards) being taken into account in such an embodiment. Over time, the bandit algorithm may examine enough information obtained from the ongoing collection of records of interactions with the ICEs to learn relationships among the rewards and the context vector elements, and may therefore be able to select more effective ICEs quickly and efficiently in various embodiments. Other optimization algorithms in which exploration-exploitation tradeoffs are analyzed, including for example neural network-based reinforcement learning algorithms/models, may be employed in different embodiments.

As indicated earlier, respective sets of optimization iterations using the machine learning model in online mode may be conducted in some embodiments for each of several presentation contexts for a given item. Examples of the different presentation contexts for ICEs may include recommendation contexts, search result contexts, item overview contexts, item details contexts, advertisements using different types of messaging mechanisms such as e-mails, social media tools, flyers, newspapers and the like. In some embodiments, a voice context may be used for presenting at least some ICEs—e.g., review excerpts may be provided by a voice-driven assistant device or another Internet-of-Things (IoT) device. Categories of ICEs which may be presented in one or more contexts may include, among others, still images, videos, audio recordings, text collections, web links, and so on. In some embodiments in which several different presentation contexts are available for a given item, the different contexts may be prioritized relative to one another—e.g., if far more consumers purchased an item as a result of viewing a recommendation than as a result of viewing an item details page, the optimization of the recommendation interface may be prioritized higher than the optimization of the details page. Records of earlier interactions performed for similar items (or the same item) in the different contexts may be analyzed to prioritize among contexts in such embodiments. In at least one embodiment, the ICOS may provide an indication of the particular presentation context or contexts for which a plurality of ICEs should be provided by a content source—e.g., it may be the case that a wider variety of ICES are needed for exploration with respect to an item details page than are needed for a search response context.

In various embodiments, different types of effectiveness or utility metrics may be generated for ICEs at the machine learning models used during the iterative optimization phase. Such metrics may include, for example, web link click count metrics, sales metrics, shopping cart insertion metrics, wish list insertion metrics, and/or session engagement length metrics. In one embodiment, any of a number of granularities corresponding to respective target audiences of item consumers may be selected for optimizing the presentation of ICEs. The granularity levels may include, for example, global granularity (where all possible consumers are considered), group granularity (e.g., for potential consumers with some shared demographic or geographic characteristics), or individual granularity (for a single individual).

Example System Environment

FIG. 1 illustrates an example system environment in which machine-learning based techniques for optimizing the presentation of informational content for at least some classes of items of an inventory may be implemented, according to at least some embodiments. As shown, system 100 comprises various components of an informational content optimization service (ICOS) 120 which may be utilized to recommend combinations of informational content elements (ICEs) to attain various types of objectives associated with items 144 (such as items 144A or 144B) of an inventory. The inventory may comprise a large number of individual items 144 in some embodiments, for at least some subset of which respective content sources 112 (such as 112A or 112B) may provide a respective collection of ICEs to the ICOS 120 via programmatic interfaces 177 in the depicted embodiment. For example, a content source 112A may be an author of a self-published book 144A which is to be offered for sale at an e-retailing web site, content source 112B may be a musician releasing a self-released music album, and so on. The particular content types of the ICEs may differ from one item to another—e.g., for a book, ICEs may include alternative examples of book cover images, descriptions, and the like, while for a music album the ICEs may include album cover artwork, audio excerpts, and the like. In various embodiments, ICEs may include text, images, video and/or audio content. The ICEs may be presented (e.g., via visual interfaces such as web sites, audio interfaces and the like) to potential and actual consumers of the items in various presentation contexts in the depicted embodiment, e.g., in response to programmatic requests (such as search requests) submitted by the consumers or as part of advertisements/promotional messages targeted at the consumers. The inventory owning organizations may keep track of the effectiveness of the presented ICEs, e.g., by logging information about interactions of the consumers with various presentation interfaces. Depending on the number of different presentation contexts used, a number of repositories or sources of the interaction records may be available for potential analysis by the ICOS in various embodiments.

Not all the items of a given inventory may necessarily be candidates for ICE presentation optimization in the depicted embodiment. In at least some embodiments, an implicit or explicit indication may be provided to a content source (such as the owner/author of an item) that one or more items for which the source can provide ICEs are candidates for optimized selection of the ICEs. For example, in one embodiment, in the case of self-published books or music collections to be offered via an e-retailer's web sites, the ICOS 120 may be established by the e-retailer, and authors or musicians may be notified programmatically (e.g., as part of a contractual agreement) by the ICOS that a set of ICEs may be needed for a given item to be introduced at the r-retailer's web sites. In some cases, the ICOS may monitor the sales or other interaction metrics associated with a given item (for which some initial ICEs may have already been presented to various potential consumers), and provide an indication that additional ICEs may be needed based on the determination that the metrics do not yet meet a success criterion. In the depicted embodiment, the ICOS 120 may comprise one or more optimization candidate item selectors 122 which are responsible for identifying the particular items 144 for which alternative ICES are to be obtained for optimization, and notifying the corresponding content sources accordingly. In at least one embodiment, an indication that a given item is a candidate for ICE presentation optimization may not be provided to the corresponding content source; for example, an author may submit alternative ICEs to the ICOS without being notified that such ICEs are needed.

Some content sources may attach presentation constraints to the set of ICEs they provide to the ICOS 120 in the depicted embodiment. The constraints may include, for example, inclusion constraints indicating portions of ICEs that should be included in the presentations provided to consumers, modification constraints indicating portions of ICEs that can or cannot be modified by the ICOS, and/or exclusion constraints indicating content which should be excluded from the presentations. In other embodiments, such constraints may not be provided by at least some content sources.

The tasks of optimizing the presentation of ICEs for various items 144 may be orchestrated by one or more ICE exploration coordinators 124 in the depicted embodiment. In various embodiments, the ICOS may comprise or have access to various types of machine learning models and associated resources (e.g., platforms at which machine learning models can be trained and executed) 115. Corresponding to individual ones of the ICEs provided by the content sources and the kinds of machine learning models (such as bandit models) to be used for optimization, one or more feature generators 123 of the ICOS may generate respective sets of input features in the depicted embodiment. The feature sets may, for example, include vectors of numerical elements which collectively represent the text of a book description, vectors which represent various characteristics of a book cover image, and so on.

In the depicted embodiment, a plurality of optimization iterations, which may also be referred to as ICE exploration iterations 147 (e.g., 147A or 147B) may be executed with respect to individual ones of the items 144 using a machine learning model in an online or continuous-learning mode. In a given iteration, a particular set of ICEs to be presented to a target audience may be identified, the identified set of ICEs may be presented, and metrics associated with the presentation may be collected and analyzed in various embodiments. Because the machine learning model is run in online mode, adjustments to the ICEs may be made relatively quickly based on the metrics and feedback collected in various embodiments. In at least some embodiments, if presentation constraints were indicated by the content sources, the ICEs to be presented may be selected according to those constraints. The metrics used to evaluate the success of a given set of presented ICEs may include, for example, a web link click metric, a sales metric, a cart insertion metric, a wish list insertion metric, or a session engagement length metric (e.g., how long a potential consumer continues to interact with a music or video item or item collection).

In at least one embodiment, during the optimization iterations, one or more ICEs may be modified at the ICOs 120, e.g., by altering the sequence of words or phrases in a description, by changing a color used in a book cover image, and so on. In the depicted embodiment, the ICOS 120 may comprise one or more ICE modifiers 128 responsible for changing the ICEs provided by content sources in accordance with any constraints which may have been indicated by the content sources for the ICEs.

Evidence of negative as well as positive feedback corresponding to a given set of presented ICEs may be analyzed in some embodiments, and the set of ICEs to be presented in a future iteration may be adjusted accordingly. Negative feedback may, for example, comprise negative reviews submitted by a purchaser of an item, records of returned items, metrics indicating a reduction in sales, and so on. Positive feedback may include records of increased sales, positive reviews, and so on. In some embodiments, natural language processing (NLP) or natural language understanding (NLP) models may be used to interpret at least some types of feedback such as reviews.

In at least some embodiments, the granularity (e.g., as represented by the size and membership of the target audience of item consumers) at which optimization is to be performed for a given item during a given time interval may be selected, e.g., by ICE exploration coordinators 124 or other components of the ICOS 120. A number of different optimization granularities may be considered in some embodiments, including for example an individual-level granularity, a group granularity, and a global granularity (in which all possible item consumers are targeted), and the target audience to which a particular combination of ICEs is presented may be selected based at least in part on the granularity.

Respective sets of ICE optimization/exploration iterations may be performed for one or more presentation contexts in some embodiments. The presentation contexts may include, for example, an item details context (e.g., an item details page of an e-retailer's web site), a recommendation context (such as a recommendation carousel of items on an e-retailer's web site), a search context, an item comparison context, an item overview/summary context, and so on. In some embodiments, the ICOS 120 may provide an indication, to a content source, of the particular contexts for which ICE exploration/optimization is to be performed, and for which various ICE alternatives or variants should therefore be provided by the content source.

In various embodiments, the components of the ICOS 120 shown in FIG. 1 may be implemented using a collection of one or more computing devices. In some embodiments, a combination of at least some the depicted components, such as feature generators 123, ICE modifiers 128, candidate item selectors 122 and/or exploration coordinators 124 may be implemented at a single computing device. In at least some embodiments, platforms external to the ICOS 210 may be used by components of the ICOS—e.g., computing devices of a machine learning service may be used for the execution of bandit models or the like. In at least one embodiment, machine learning algorithms may be used for tasks other than the optimization/exploration iterations themselves—e.g., machine learning may be used to identify candidate items for ICE optimization, for modifying ICEs, and so on.

Optimization Candidate Characteristics

Figure 2:
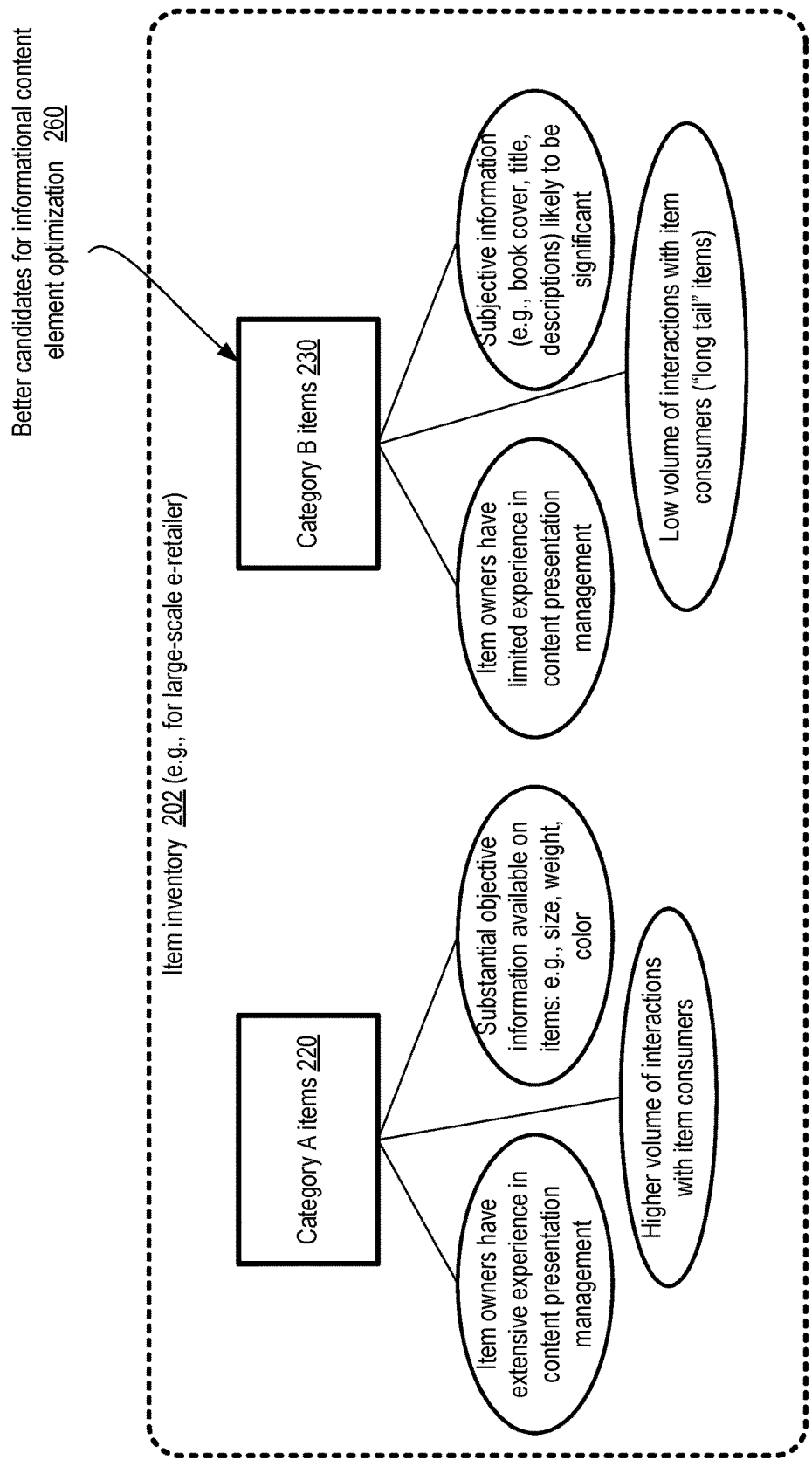
FIG. 2 illustrates example characteristics of items which may be used to determine whether the items should be considered candidates for informational content element optimization, according to at least some embodiments.

As mentioned earlier, in at least some embodiments, some items of an inventory may be better suited for ICE optimization than others. FIG. 2 illustrates example characteristics of items which may be used to determine whether the items should be considered candidates for informational content element optimization, according to at least some embodiments.

In the depicted embodiment, a large inventory 202 (e.g., an inventory comprising thousands or millions of items made accessible over the Internet by an e-retailing organization) may be broadly classified into at least two item categories. Category A items 220 may have item owners with extensive experience in content presentation management for their respective items. Furthermore, category A items may typically have substantial objective information available regarding the items—e.g., size information, weight information, color information, version information and the like may be available. In many cases, for category A items, the traffic level or volume of interactions with potential item consumers (e.g., visits to the web pages on which the items are displayed, number of purchase transactions etc.) may be relatively high.

In contrast to category A items, the items 230 of category B may typically have item owners with limited experience in content presentation management. Furthermore, in at least some cases, subjective information about the items (such as book cover contents, descriptions, titles etc.) may be expected to be significant in determining the success of the items (as measured, for example, via sales or other metrics). The traffic level or volume of interactions with potential consumers of category B items may be relatively low; as such, category B items may represent the "long tail" with respect to overall item interaction volumes. In the depicted embodiment, category B items may be more likely to be considered candidates 260 for ICE optimization. With regard to category A items, decisions regarding ICE presentation may be left largely or wholly to the item owners in some embodiments. In one embodiment, a machine learning algorithm such as a classifier may be used to determine whether a given item is a category A item or a category B item. In some embodiments, the distinction between category A items and category B items may not be clear cut—e.g., the success of items with numerous objective informational elements such as size, color, weight etc. available may be influenced by characteristics of the images of the items, item descriptions, and so on. As a consequence, in such embodiments, ICE optimization iterations may be conducted for items of both categories. In one embodiment, ICE optimization iterations may be executed by default (assuming ICE alternatives are available) for all items of an inventory.

Example Content Submissions by Item Owners

Figure 3:
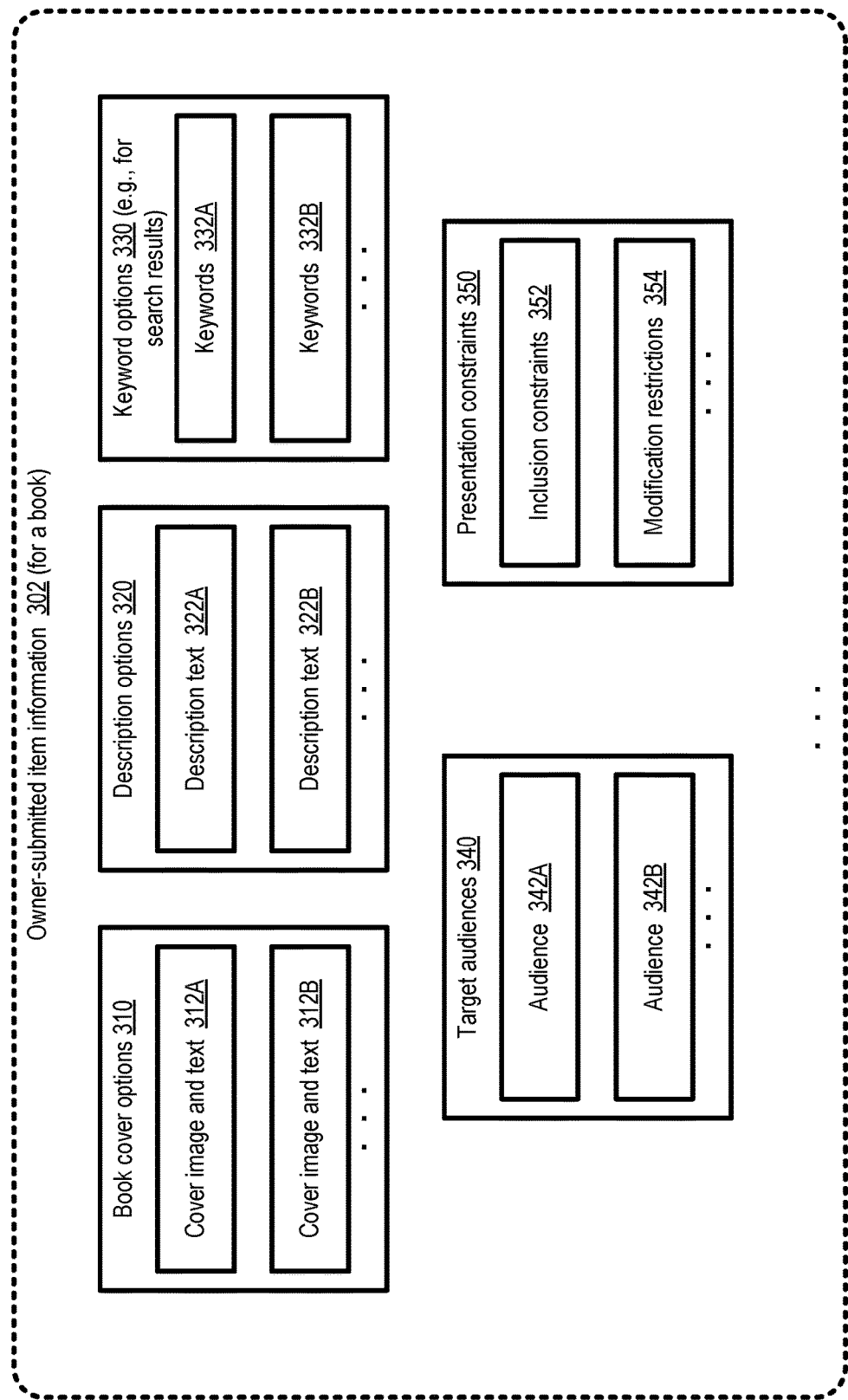
FIG. 3 illustrates examples of the types of data which may be provided programmatically by an item owner or producer to a service for optimization of informational content presentation, according to at least some embodiments.

FIG. 3 illustrates examples of the types of data which may be provided programmatically by an item owner or producer to a service for optimization of informational content presentation, according to at least some embodiments. In the depicted example scenario, the owner-submitted item information 302 is associated with a book to be sold or made accessible via an e-retailer.

A number of options 310 for book covers, indicating respective combinations of cover images and text 312 (such as 312A or 312B) may be provided to an ICOS by the book's owner or author in the depicted embodiment. Various examples of description text (such as 322A or 322B) may be provided as alternative description options 320. In some embodiments, a number of different keywords 332, such as 332A or 332B, may be provided as another set of ICE options 330, e.g., to be used for search indexes and corresponding search result presentation contexts.

In some embodiments, the item owner may indicate one or more target audiences 340 for the item, such as audiences 342A and 342B. For example, a book may be intended to appeal to mystery enthusiasts, as well as to romance enthusiasts, and such information may be used at an ICOS to adjust the combinations of ICEs presented to various potential readers. In some embodiments, the item owner may suggest various specific ICEs as appropriate for the different target audiences.

As mentioned earlier, in various embodiments, an item owner may indicate one or more presentation constraints 350 with regard to the ICEs being provided. A number of different types of presentation constraints 350 may be provided in some embodiments, including for example inclusion constraints 352 (indicating portions of an ICE which should always be included in a presentation according to the item owner), modification restrictions 354 (indicating which portions of various ICEs can or cannot be modified by the ICOS), and so on.

Optimization Iteration Overview

Figure 4:
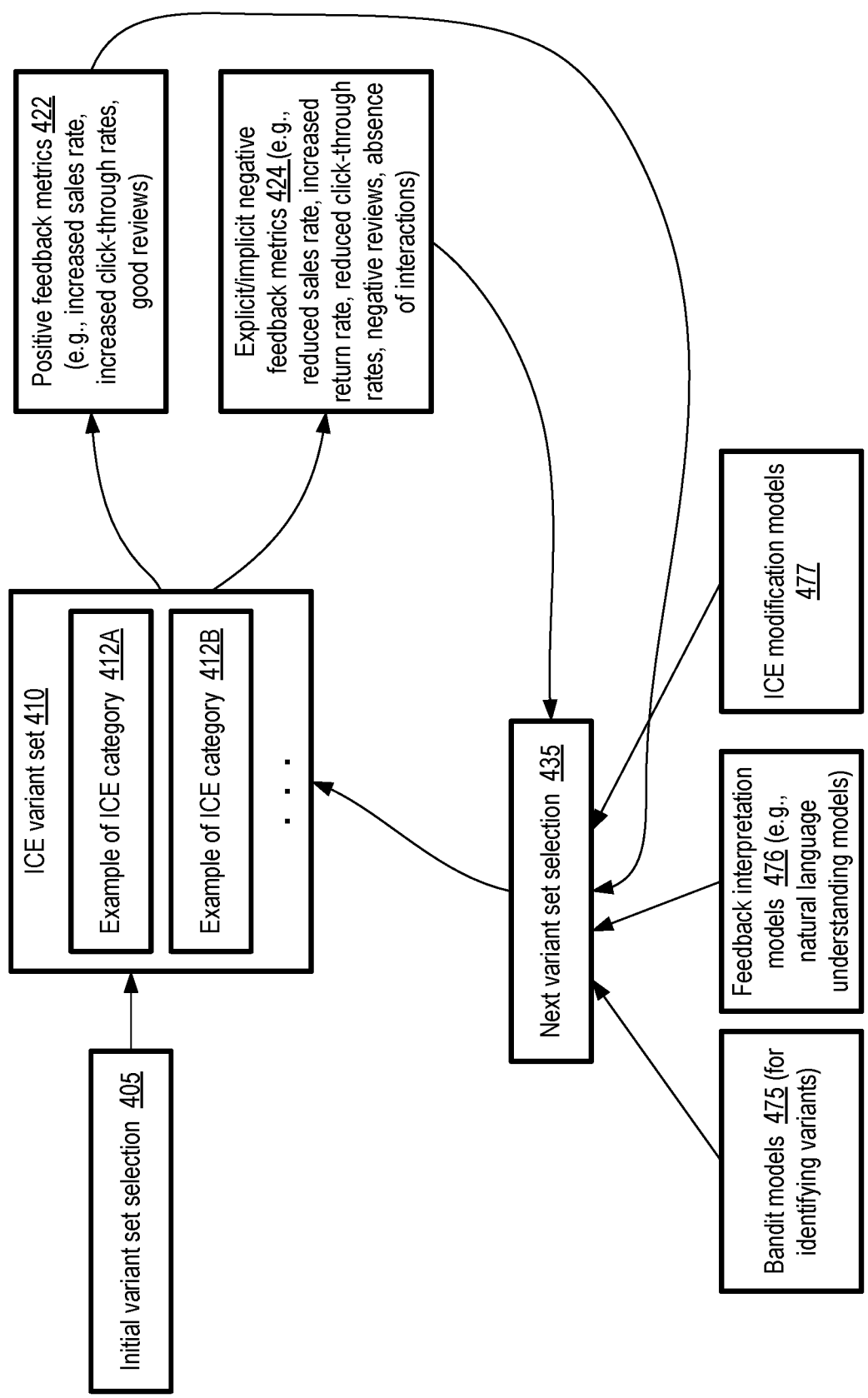
FIG. 4 illustrates aspects of an example high-level workflow for optimizing presentation of informational content elements, according to at least some embodiments.

FIG. 4 illustrates aspects of an example high-level workflow for optimizing presentation of informational content elements, according to at least some embodiments. An initial selection 405 of an ICE variant set 410 from among the available alternatives for various ICE categories may be performed to begin the optimization process in the depicted embodiment. The variant set 410 may comprise respective examples 412 (e.g., 412A and 412B) of one or more ICE categories, such as (in the case of books) book covers, descriptions, and so on.

The ICE variants selected may be exposed or presented to one or more target audiences, and feedback metrics may be collected for some selected time period in the depicted embodiment. Both positive feedback metrics 422 and negative feedback metrics 424 may be collected in various embodiments. Positive feedback metrics 422 may comprise, for example, increased sales rates, increased click-through rates on web links provided along with the ICEs, positive reviews and the like. Negative feedback metrics 424 may comprise the converse of the positive feedback metrics, and may include, for example, reduced sales rates, increases in the number of times the item is returned after purchase, reduced click-through rates on web links, negative reviews, and the like. In some embodiments, at least some of the negative feedback may be implicit rather than explicit—e.g., the absence (or low volume) of views of a page showing ICEs for a book during some time interval may be considered negative feedback. Counts of various types of interaction with potential item consumers with presented combinations of ICEs may be kept in various embodiments, and if the count for a particular type of interaction is below a threshold, this may be interpreted as implicit negative feedback. The metrics whose values may be classified (depending on their values or rates of change) as positive or negative feedback may also be referred to as effectiveness metrics or utility metrics with respect to the ICE variant set being explored in the depicted embodiment. The metrics may be analyzed, for example using a machine learning algorithm (such as a bandit algorithm 475) run in an online or continuous-learning mode, and the next selection 435 of the ICE variant set 410 may be based at least on part on the results of the metric analysis. In some embodiments, one or more additional machine learning models 476 (e.g., natural language understanding models) may be used to interpret the sentiment or semantics of some types of feedback such as reviews. In at least one embodiment, additional machine learning models 477 (e.g., generational neural network models) may also or instead be employed to modify ICEs provided by the item owner, in accordance with specified constraints indicated by the item owner.

The duration for which optimization iterations are conducted for a given item may vary in different embodiments. In some embodiments, the ICOS may track the rate of change in the collected metrics as more optimization iterations are completed. If the rate of improvement of the metrics falls below a selected threshold, the optimization iterations may be terminated in some embodiments. In other embodiments, especially for some types of items for which the rate of consumer interactions is low, the iterations may be continued for the duration for which the item remains accessible to consumers.

Example Timeline

In at least some embodiments, as new combinations of ICE variants are tried out during the optimization iterations, further experimentation for some types of ICE variants may no longer be required even as further experimentation for other types of ICE variants continues. That is, the optimal (or near-optimal) ICEs of different categories may be identified at different times, potentially reducing the total number of different ICE combinations that have to be explored subsequently.

Figure 5:
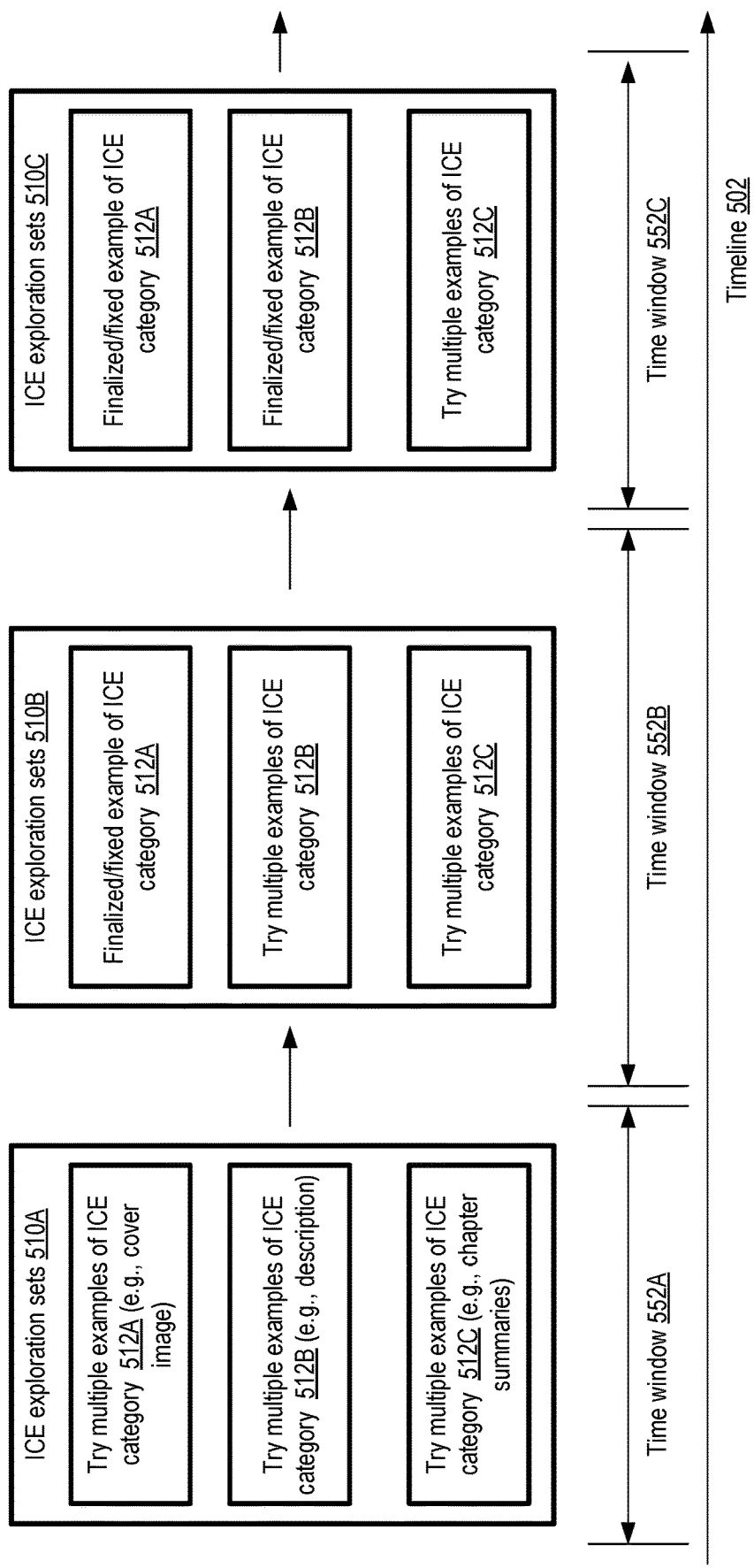
FIG. 5 illustrates an example timeline showing respective time windows in which the effectiveness of respective combinations of informational content elements may be explored, according to at least some embodiments.

FIG. 5 illustrates an example timeline showing respective time windows in which the effectiveness of respective combinations of informational content elements may be explored, according to at least some embodiments. Three time windows 552A, 552B and 552C are shown by way of example along timeline 502 in the depicted embodiment. In the first time window 552A, the effectiveness of multiple examples of three different ICE categories 512A (such as book cover images), 512B (such as book descriptions), and 512C (such as chapter summaries) may be explored using a machine learning model such as a bandit model. During this first set of explorations, the optimal example of category 512A may be identified, and a decision may be made at the ICOS that no further experimentation with regard to category 512A is needed.

As a consequence, finalized/fixed example of ICE category 512A may be used during the exploration iterations performed in time windows 552B and 552C in the depicted embodiment. In time window 552B, multiple examples of ICE categories 512B and 512C may be tried out, resulting in the identification of the optimal or final example of ICE category 512B. Thus, in time window 552C, only variations on category 512C may be needed, as the optimal examples to be used for categories 512A and 512B may already have been identified. It is noted that the number of different examples that can potentially be explored may differ from one ICE category to another in at least some embodiments—as such, identifying the optimal example may be easier and quicker for some categories than others.

Example ICE Categories

Figure 6:
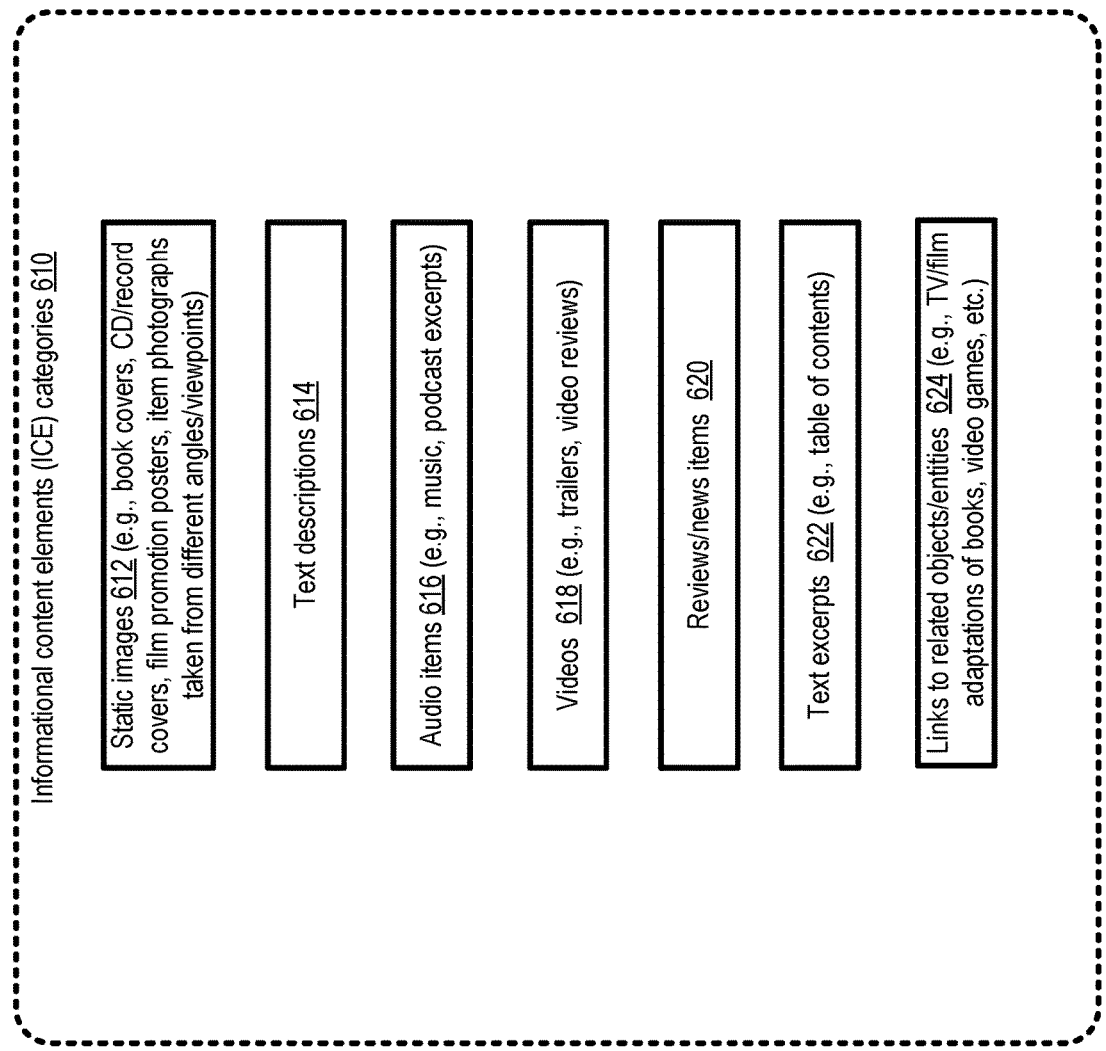
FIG. 6 illustrates example categories of informational content elements, according to at least some embodiments.

A wide variety of ICEs may be employed in some embodiments, depending on the type of item for which informational content can potentially be provided in various context. FIG. 6 illustrates example categories of informational content elements, according to at least some embodiments. As shown, some ICEs 610 may comprise static images 612, such as book covers, CD/record covers in the case of music items, film promotion posters, item photographs taken from different angles/viewpoints and so on in the depicted embodiment. Other ICEs may comprise text descriptions 614. In some embodiments, audio items 616, such as excerpts of music, songs, advertising jingles, podcasts, and the like may be used as ICEs for some items.

In one embodiment, videos 618, e.g., trailers, video reviews and the like may be used to convey information about some items of an inventory. Features derived from videos 618 and static images 612 may collectively be referred to as image-based features in various embodiments. News items or reviews 620, generated prior to or after publication by professional or amateur critics, may be used as ICEs in some embodiments. For items comprising text, such as books, excerpts 622 of the items themselves may be used as ICEs in various embodiments. In at least one embodiment, links to related objects or entities 624, such as TV/film adaptations in the case of books, video games and the like may also be considered ICEs.

The particular combination of ICE categories may vary for different items of an inventory in different embodiments—that is, not all the items in a given inventory, or even with an item category, may have associated ICEs of the same categories. In at least some embodiments, one or more ICEs for an item may be modified, partially generated or synthesized by the ICOS, instead of being provided by the producer/vendor of the item.

Presentation Contexts

Figure 7:
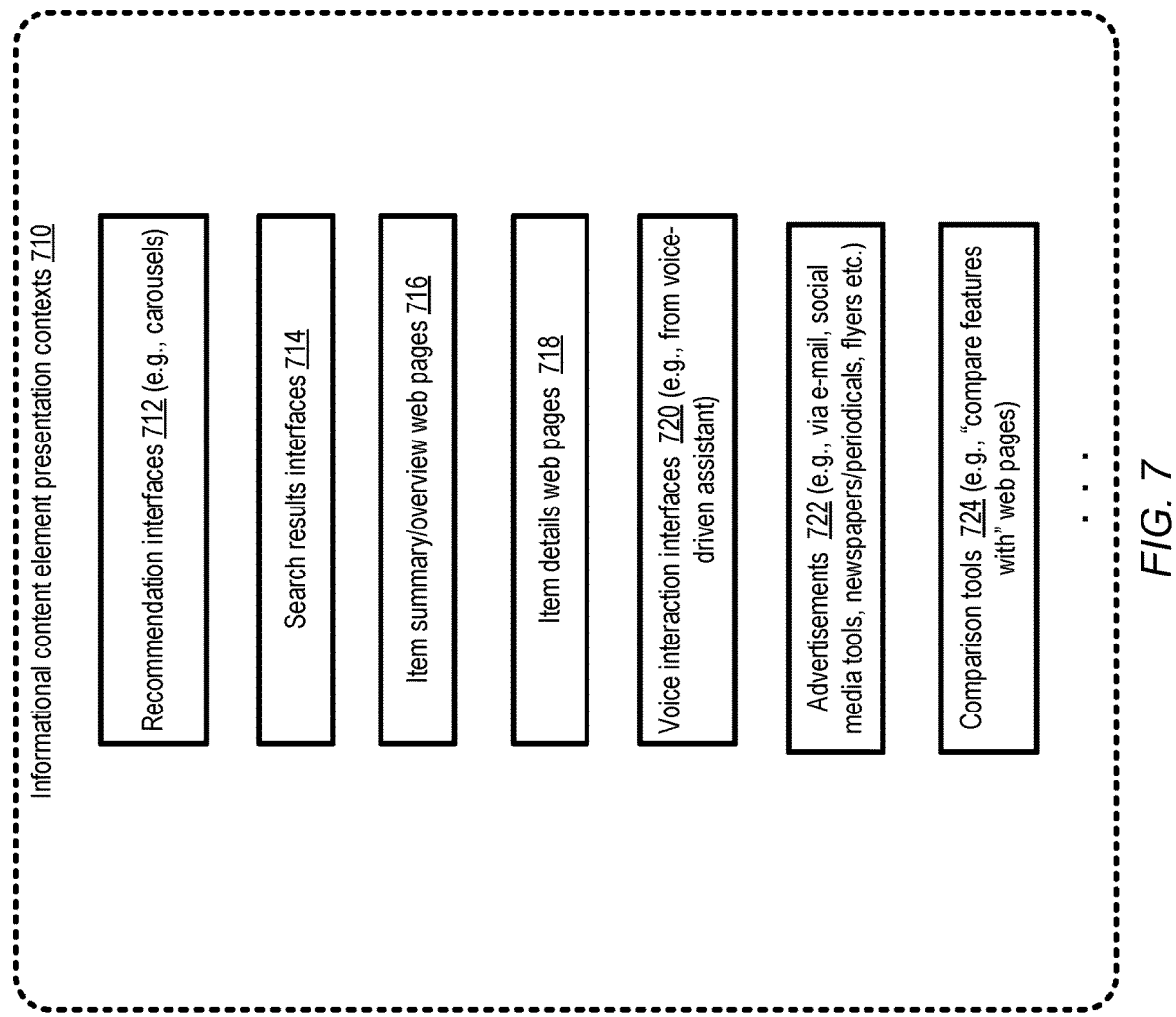
FIG. 7 illustrates example presentation contexts for informational content elements, according to at least some embodiments.

FIG. 7 illustrates example presentation contexts for informational content elements, according to at least some embodiments. In some embodiments, contexts 710 may include graphical recommendation interfaces 712, such as carousels comprising images of recommended items or lists of recommended items. Recommendation interfaces may include images, text and/or other forms of content in some embodiments.

Search results interfaces 714 may comprise another prominent mechanism for presenting ICEs in at least some embodiments. A number of different types of search tools may be used in different embodiments to submit queries about items in an inventory—e.g., text-based search (with or without auto-fill), image-base search and/or voice-based search may be supported, and each such tool may have a corresponding results interface for which ICE presentation may be optimized.

In scenarios in which items belong to an inventory of an e-retail (or e-wholesale) web site, item summary/overview web pages 716 and item details web pages 718 may represent additional opportunities for presenting ICEs associated with a given item in some embodiments. In at least one embodiment, a number of alternative layouts may be possible for arranging a set of ICEs within a given item overview web page 716 or item details web page 718. For example, the relative positioning of two images, or of an image and a text extract, may potentially be modified in different layouts. In some embodiments, in addition to exploring the effectiveness of different ICEs, the effectiveness of different layouts comprising the same set of ICEs may also be explored by an ICOS, with recommended layouts being identified as the output of a machine learning model.

In at least some embodiments, voice interaction interfaces 720 may provide another context in which ICEs are presented to potential item consumers. For example, a voice-drive assistant device may be used to present vocalized information about items of an inventory in response to specific queries and/or based on the assistant device owner's preferences. In one embodiment, ICE optimization may be performed for one or more forms of advertisements 722, such as advertisements sent via e-mails, social media tools, newspapers/periodicals, flyers and the like. In some embodiments, comparison tools 724, such as web pages which allow potential consumers to compare features of different items, may represent another presentation context for ICEs. ICE presentation optimization may be performed for one or more context not shown in FIG. 7 in some embodiments. In at least one embodiment, ICE presentation optimization may not necessarily be implemented for one or more of the contexts shown in FIG. 7.

ICE Presentation Effectiveness Metrics

Figure 8:
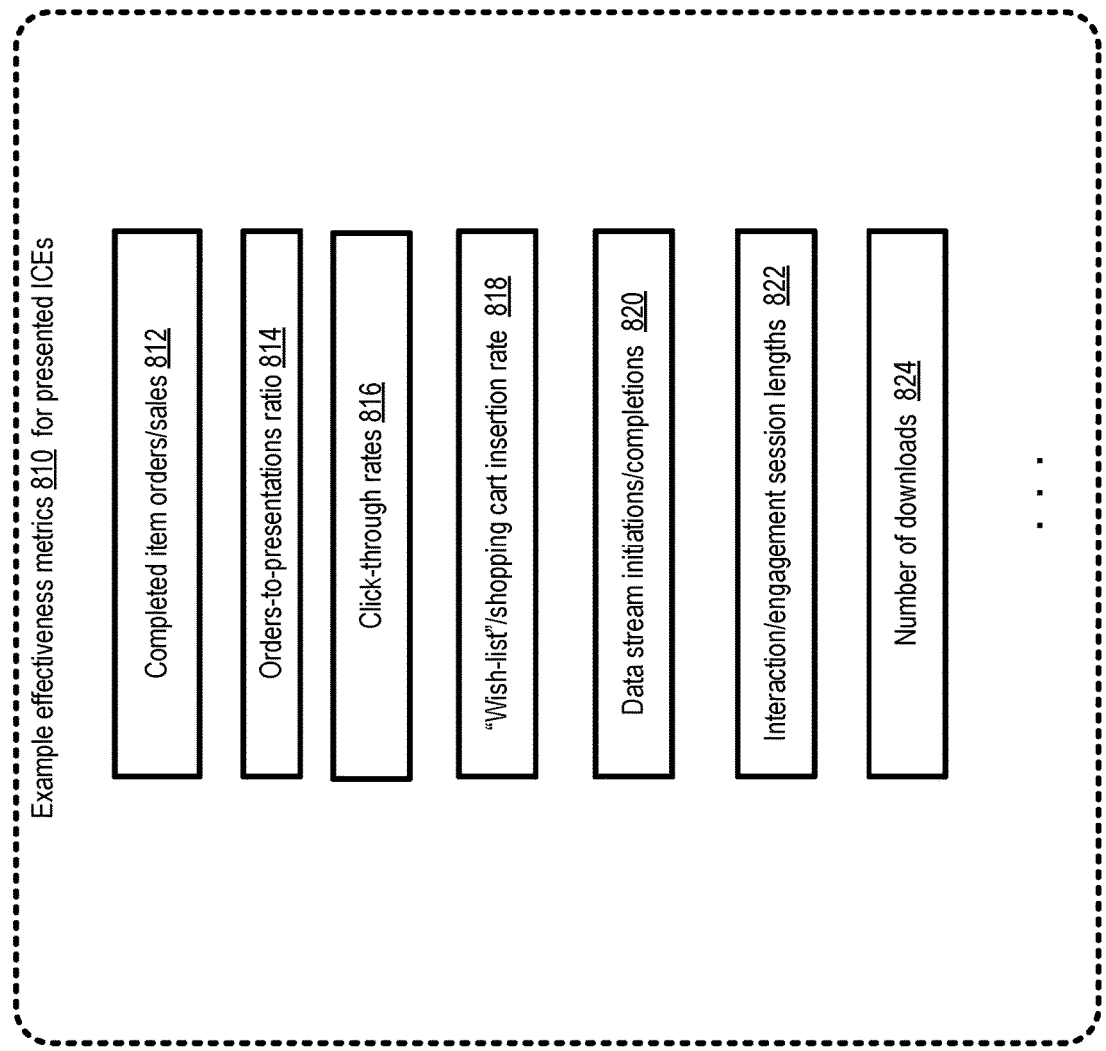
FIG. 8 illustrates example effectiveness metrics for presented informational content elements, according to at least some embodiments.

As mentioned earlier, in at least some embodiments, machine learning models may be used for exploring ICE combinations. Such models may be trained to produce predicted or estimated effectiveness metrics (which may also be referred to as utility metrics) of various kinds for features of the ICEs being considered. FIG. 8 illustrates example effectiveness metrics for presented informational content elements, according to at least some embodiments.

In some embodiments, the total number of completed sales or orders 812 over some time interval during which a particular set of ICEs was presented may be used as an effectiveness metric. In one embodiment, instead of using the absolute number of sales, the ratio 814 of orders or sales to presentations may be used as the metric.

In some embodiments, together with ICEs being presented, a link on which a potential item consumer may click to obtain additional information or to purchase the item may be provided, and the click-through rate 816 (the rate at which the link for a particular item was clicked on, or the ratio of clicks to presentations of the link) may be used as an effectiveness metric.

E-retail web sites may track how often a given item was inserted into a shopping cart (even if the item was not purchased shortly after such an insertion), or how often an item was added to a public or private "wish list" of a potential consumer. Such wish lists may be used to indicate that a potential consumer would like to obtain the inserted item, but will not necessarily purchase the inserted item immediately. Wish list insertions may, for example, serve as a signal to potential gift-givers regarding the consumer's preferences, or may simply be used as a temporary repository for items the consumer may purchase later. The rate 818 of insertion of an item into a wish list or a shopping cart maybe used as another effectiveness metric in some embodiments.

In some cases, one or more items of an inventory may not necessarily have to be purchased, but may be consumed in other ways—e.g., digitized books may be borrowed rather than bought, or films/videos may be streamed by a subscriber rather than purchased. In some embodiments, depending on the item consumption model, data stream initiations or completions 820 may be used as effectiveness metrics. For some types of items the number of downloads 824, and/or the rate of downloads, may be used as an effectiveness metrics.

In one embodiment, the owner of the inventory may measure the lengths of the sessions during which potential consumers interact with a service provided by the owner, and such interaction/engagement session lengths 822 may be used as an effectiveness measure. Depending on the nature of the items and/or services being provided, for example, more advertisements may be presented during longer engagement sessions in some embodiments, so the length of the sessions may be tied to revenue.

Optimization Granularities

Figure 9:
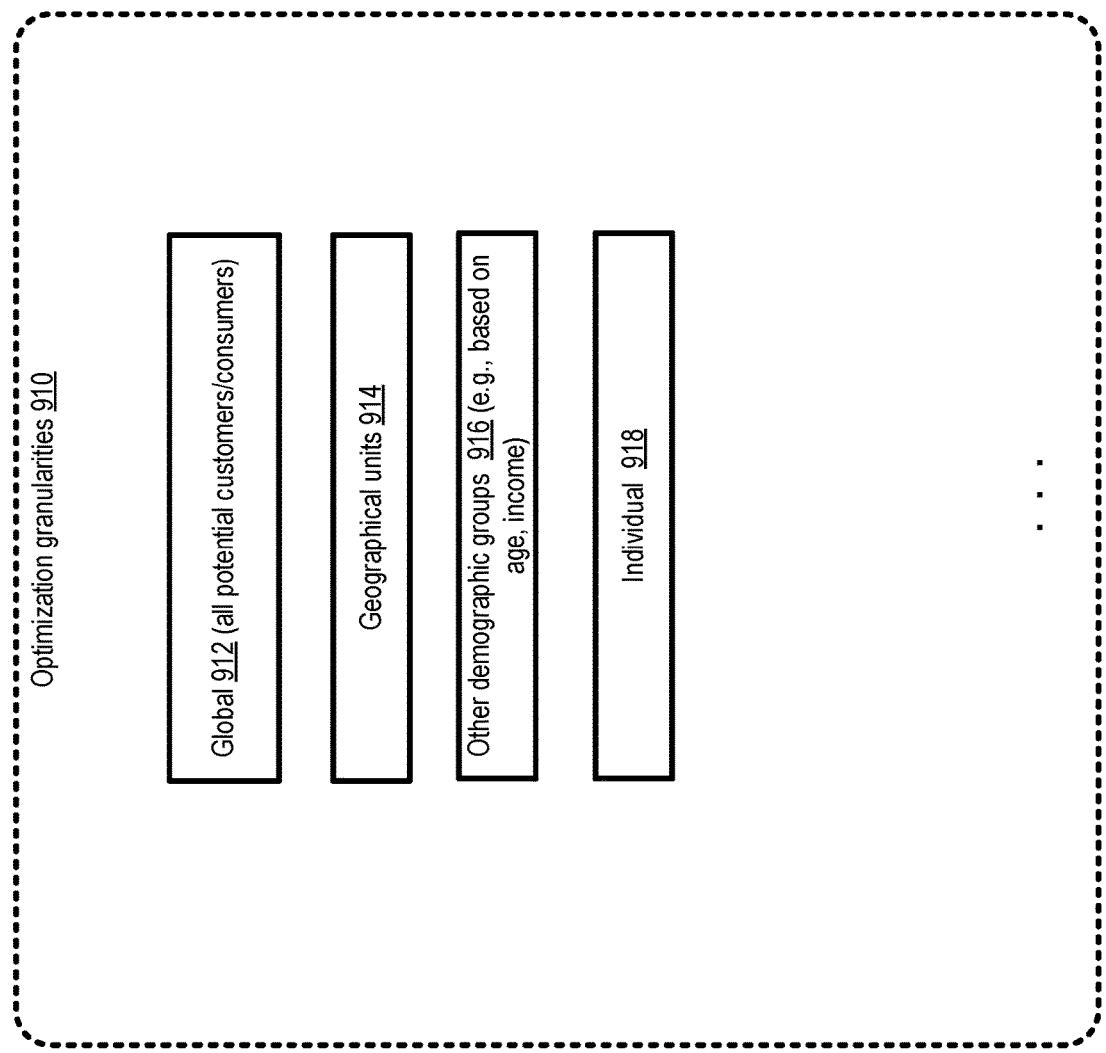
FIG. 9 illustrates example granularities at which the presentation of informational content elements may be optimized, according to at least some embodiments.

FIG. 9 illustrates example granularities at which the presentation of informational content elements may be optimized, according to at least some embodiments. As shown, the granularities 910 may include, among others, a global granularity 912, geographical units 914, other demographic groups 916 and/or individual granularity 918 in the depicted embodiment.

When optimization is performed at a global granularity 912, the target audience to which variants of ICE sets are presented may comprise any potential item consumers; as such, records of interactions of all consumers with the different variants being explored may be used to learn the effectiveness of the ICEs presented. In some cases, the popularity (and the reasons for the popularity) of at least some items may vary from one geographical region or country to another, and it may be possible to segregate the records of interactions with the different ICE versions geographically. In some such scenarios, in effect, respective machine learning models may be used for each geographical unit 914 or region of interest in various embodiments.

Other demographic groups 916, such as groups based on age, income, gender or the like may be used for separate optimization of ICE presentation in some embodiments. Finally, in at least one embodiment, the optimizations may be customized to the level of individual consumers 918—that is, a personalized optimal set of ICEs to be presented to respective individual consumers may be generated. For example, in a scenario in which ICE combinations for books are to be presented at an e-retailer's web site, information regarding the history of book purchases by an individual may be examined to predict the types of books the individual likes to read, and personalized collections of ICEs selected based on the deduced preferences of the individual may be explored. In various embodiments, characteristics specific to the group or individual may be represented, for example, in the feature vectors used in the exploration/optimization iterations. In some embodiments, model parameters learned for one demographic group or individual may be transferred or shared (at least as starting points in the exploration iterations) with other models for similar groups or individuals.

In various embodiments, the target audiences to which variants of ICEs are presented during optimization iterations may be selected based at least in part on the optimization granularity level selected. In some embodiments, peer groups of potential consumers may be identified for at least some potential consumers, so that it becomes easier to collect feedback when individual-level granularity is employed. That is, in such embodiments, the effectiveness of a given ICE set with respect to a given individual may be approximated using the effectiveness of that ICE set with respect to a set of peers identified for that individual. Other optimization granularities that those shown in FIG. 9 may be used in some embodiments.

Provider Network Environment

Figure 10:
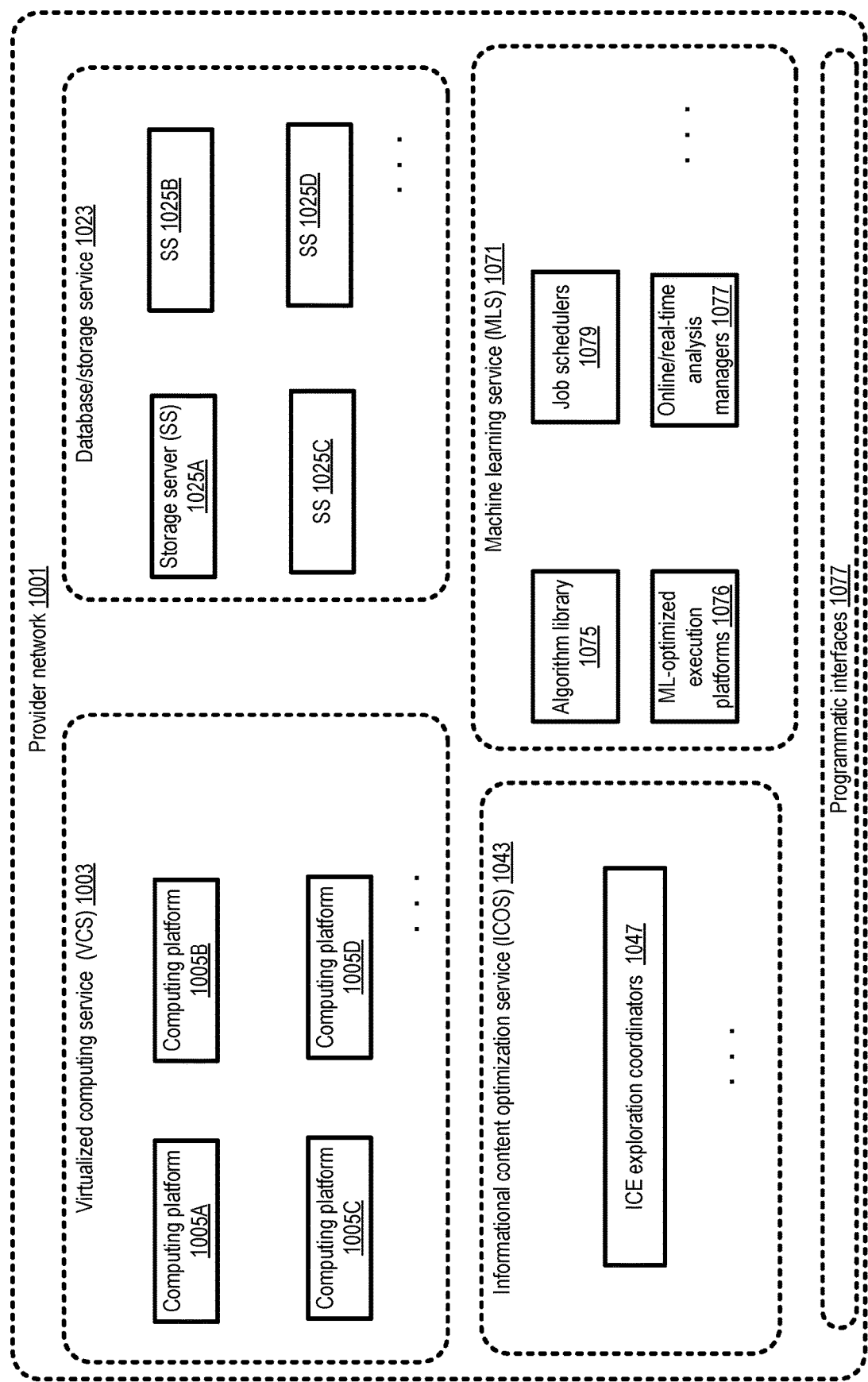
FIG. 10 illustrates a provider network environment at which an informational content optimization service may be implemented, according to at least some embodiments.

In some embodiments, the techniques discussed above for analyzing and improving informational content presentation may be implemented at a provider network. FIG. 10 illustrates a provider network environment at which an informational content optimization service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 1001 may comprise resources used to implement a plurality of services, including for example a virtual computing service (VCS) 1003, a database or storage service 1023, a machine learning service (MLS) 1071 and an informational content optimization service (ICOS) 1043. In some embodiments, the ICOS 1043 may be implemented as a subcomponent of the MLS 1071. Components of a given service may utilize components of other services in the depicted embodiment—e.g., for some machine learning tasks, a component of the machine learning service 1071 may utilize virtual machines implemented at computing platforms such as 1005A-1005D of the virtualized computing service. Input data, intermediate results, final results and/or other artifacts of various machine learning algorithms or models, such as those used for identifying baseline ICE sets, identifying ICE recommendations, or generating synthetic ICEs may be stored at storage servers 1025 (e.g., 1025A-1025D) of the database or storage service 1023 in some embodiments. Individual ones of the services shown in FIG. 10 may implement a respective set of programmatic interfaces 1077 which can be used by external and/or internal clients (where the internal clients may comprise components of other services) in the depicted embodiment.

As shown, the informational content optimization service 1043 may comprise, among other components, one or more analysis workflow coordinators 1047 in the depicted embodiment. The analysis coordinators 1047 may, for example, invoke algorithms selected from the machine learning algorithm library 1075 to train and/or execute one or more models required to implement ICE optimization/exploration iterations in the depicted embodiment. In some embodiments, requests to train some types of machine learning models (such as models used for ICE interpretation or ICE modification) may be handled as batch jobs at the machine learning service, and a batch job scheduler 1079 may orchestrate the allocation of resources for the jobs as well as dependencies among jobs. In the depicted embodiment, online/real-time analysis managers 1077 of the MLS 1071 may be responsible for executing the algorithms (such as bandit algorithms) used to explore the effectiveness of ICE variants. In at least one embodiment, a machine learning service 1071 may have access to or include a set of execution platforms 1076 that are optimized for machine learning tasks (e.g., platforms that have customized hardware such as GPU arrays and/or customized software stacks). Depending on the suitability of such platforms for ICE optimization-related tasks, one or more execution platforms 1076 may be employed for ICE optimization in the depicted embodiment.

In at least some embodiments, the workflows discussed earlier for ICE presentation optimization may be accomplished using non-specialized computing platforms of the virtualized computing service 1003. In various embodiments, the training and test/evaluation data used for various models for ICE optimization (and/or records of the item inventory and the ICE variants) may be stored at a database/storage service 1023. As mentioned earlier, the techniques for analyzing the effectiveness of ICEs and identifying recommended ICEs described above may be implemented without acquiring resources of network-accessible services such as those shown in FIG. 10 in at least some embodiments. For example, a standalone tool implemented at one or more computing devices which are not part of a network-accessible service may be used in some embodiments.

Methods for Optimizing ICE Presentation

Figure 11:
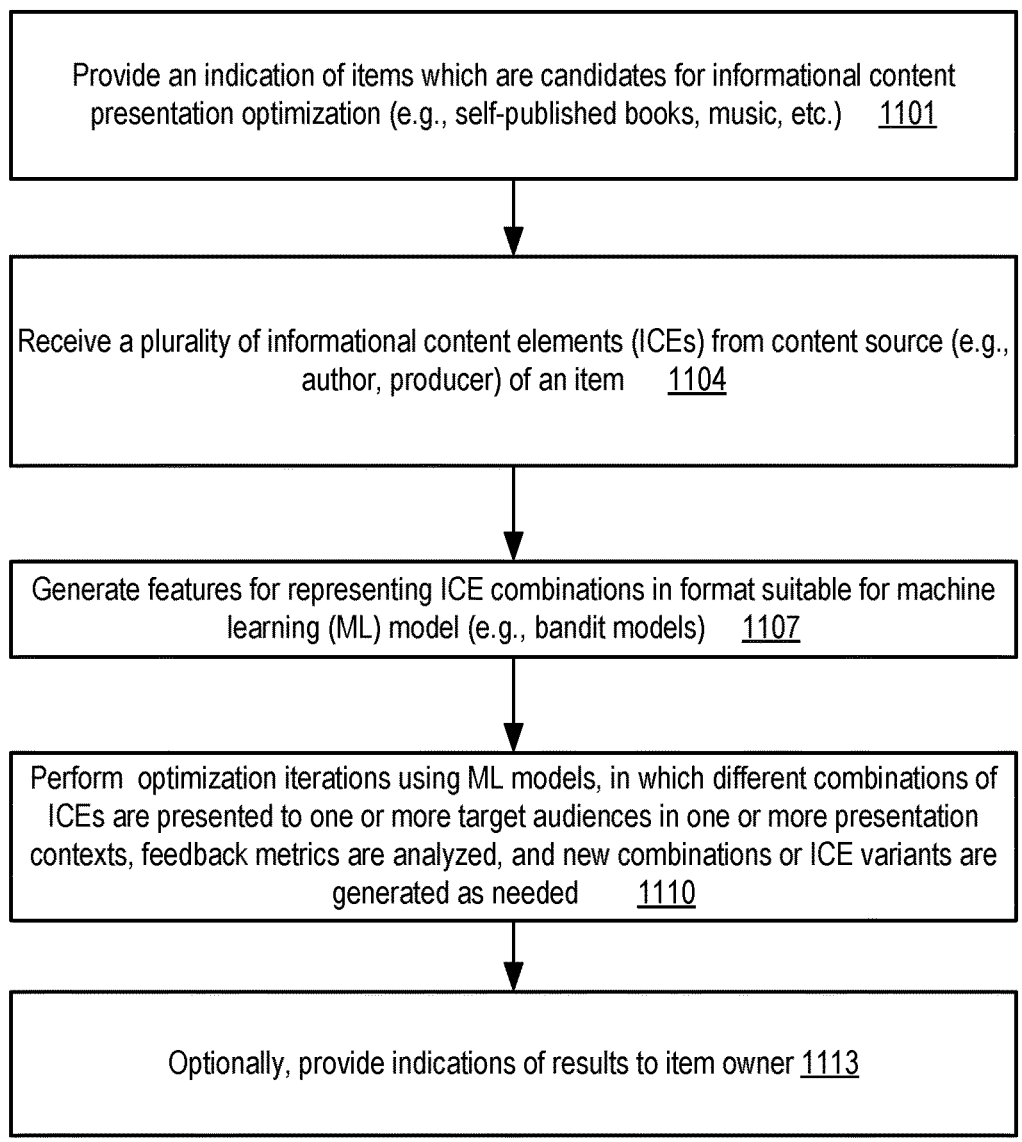
FIG. 11 is a flow diagram illustrating aspects of operations that may be performed to optimize the presentation of informational content elements, according to at least some embodiments.

FIG. 11 is a flow diagram illustrating aspects of operations that may be performed to optimize the presentation of informational content elements, according to at least some embodiments. As shown in element 1101, an indication may be provided, e.g., by components of a network-accessible informational content optimization service (ICOS) via a programmatic interface of the types of items (or specific items) which are candidates for ICE presentation optimization. In some cases, items which belong to certain categories, such as self-published books or music albums, may automatically be classified as candidates for ICE optimization; in other cases, an analysis of the properties/attributes of the items may be performed to determine whether the item should be considered a candidate for ICE optimization. In some embodiments, an item may be identified as a candidate for ICE optimization at some time after it has been introduced into the inventory and made accessible to possible consumers—e.g., if the sales or other target metrics of the item fail to meet specified goals of the item owner or the e-retail organization presenting the item, it may be considered a candidate. In one embodiment, by default, all items of an inventory may be considered candidates for ICE optimization, in which case no indication of candidacy may have to be provided. In some embodiments, the ICOS may notify an item's owner or author that optimization of ICE presentation is to be performed for the item in one or more presentation contexts or for one or more targeted demographics, and request that examples of ICEs be provided for those contexts and/or demographics. Such requests may be sent at various points during the lifetime of the item in some embodiments if needed—e.g., if a book is found to be selling well in some states of a country but selling poorly in other states, the author may be asked to provide alternative ICEs to be tried in the states where the book has been selling poorly.

A plurality of ICEs pertaining to a candidate item may be received at the service or tool being used for ICE optimization (element 1104), e.g., from a content source such as the owner/author of the item in various embodiments. As mentioned earlier, depending on the nature of the item and the contexts in which ICEs are to be presented, examples of any of a wide variety of ICE categories may be provided, including for example text descriptions, images, videos, audio items, and the like, with several alternatives being provided for one or more categories. In some cases, item owners may indicate constraints on the portions of content that must be included in a particular ICE, restrictions on which portions of ICEs are modifiable by the service, and so on.

Features which can be used to represent, in the input provided to a machine learning model, various individual ICEs and the combinations of ICEs may be generated in the depicted embodiment (element 1107). The features may, for example, represent text descriptions as vectors within a word embedding space, images as encoded matrices of numeric values indicating colors and shapes, and so on.

One or more optimization iterations may be performed using the features representing different ICE combinations in the depicted embodiment (element 1110). In a given optimization iteration, a machine learning model (such as a bandit model) may be used in an online or continuous learning mode to determine the set of ICE variants or presentation to a target audience in one or more contexts. In some embodiments, some of the ICEs presented in one or more contexts may comprise modified versions of ICEs provided by item owners, generated in accordance with any constraints indicated by the item owners. The selected ICEs may be presented to the target audience, and feedback metrics indicating the effectiveness of the presentation may be collected and analyzed. Depending on the effectiveness, new variants of ICE combinations may be selected for the next iteration in various embodiments. The iterations may be continued until a termination criterion (such a determination that the marginal improvement in effectiveness metrics with new exploratory iterations has fallen below a threshold) is met in some embodiments. For some items, such as items for which the rates of consumer interactions fall below a threshold, or the iterations may be conducted indefinitely. Optionally, in some embodiments, indications of the results of the optimizations (such as the change in various effectiveness metrics) may be provided to the item owner (element 1113)

It is noted that in various embodiments, some of the operations shown in FIG. 11 may be implemented in a different order than that shown in the figure, or may be performed in parallel rather than sequentially. Additionally, some of the operations shown in FIG. 11 may not be required in one or more implementations.

Use Cases

The techniques described above, of iteratively identifying recommended informational content elements for various inventory items and presentation contexts may be useful in a variety of scenarios. Many Internet-based retailing/wholesaling organizations, online auction organizations, libraries or subscription sites for video and/or text content may have very large inventories, running into millions of objects. Several different versions of collateral material, such as images, review text excerpts and the like may be obtained for a given item, such as a self-published book. In some cases, it may also be possible to modify or generate some of the collateral information, e.g., based on analyzing the relative success of presenting pre-existing content elements in the different contexts. Using machine learning-based optimization algorithms such as bandit algorithms as described, it may be possible to identify the right set of informational content elements to help achieve item consumption goals of the inventory owners at desired levels of optimization granularity—e.g., for different demographic or geographic groups of potential item consumers.

Illustrative Computer System

Figure 12:
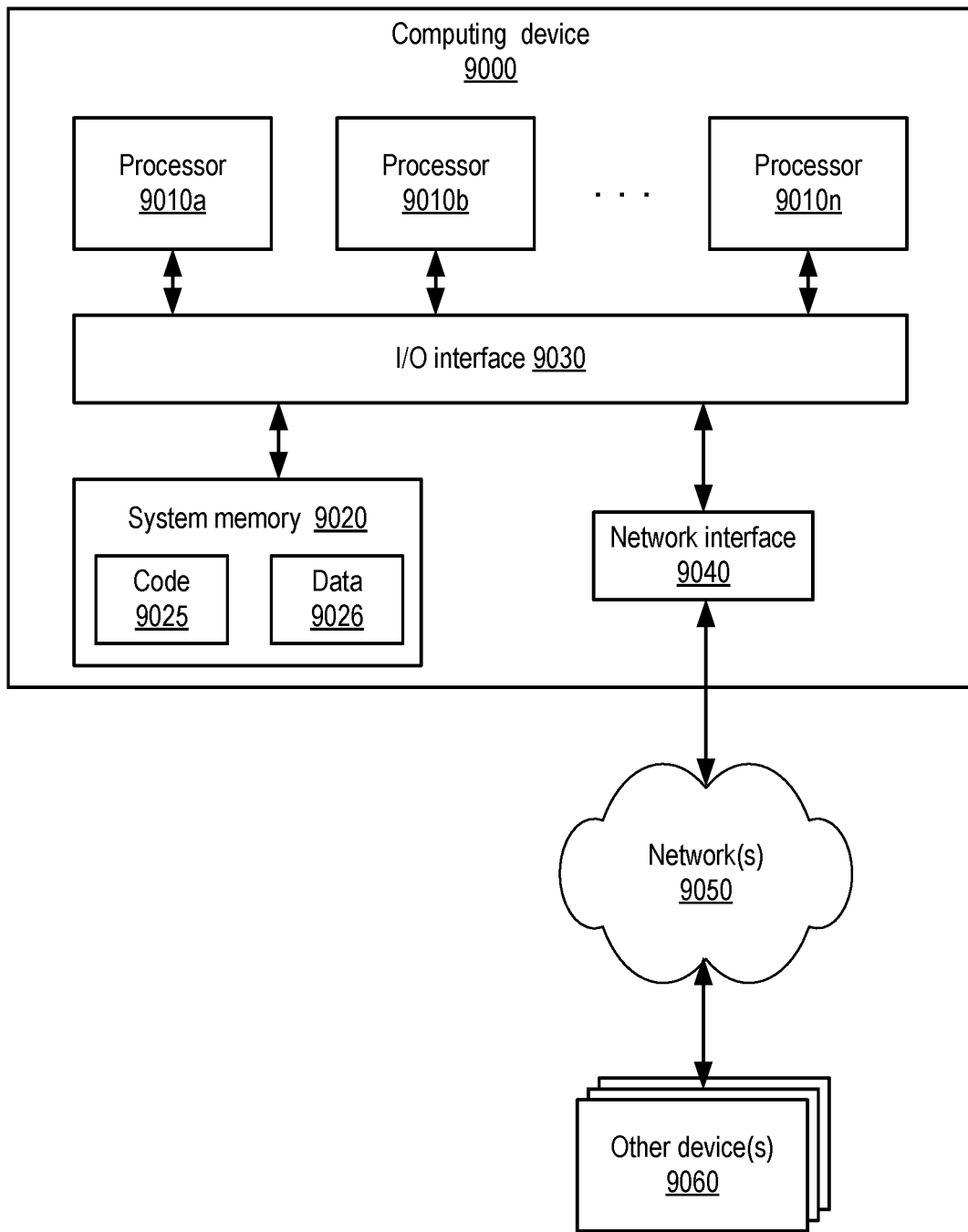
FIG. 12 is a block diagram illustrating an example computing device that may be used in at least some embodiments.

In at least some embodiments, a server that implements a portion or all of one or more of the technologies described herein, including the various components of an informational content optimization service such as exploration coordinators, ICE modifiers, feature generators, optimization candidate item selectors, trainers and executors of machine learning models, and the like may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a network-based content provider configured to present informational content for a plurality of items in one or more presentation contexts over a network for a plurality of sources of the items;
one or more other computing devices of an artificial intelligence service for optimizing presentation of informational content for at least some of the plurality of items;
wherein the one or more other computing devices of the artificial intelligence service are configured to:
classify the plurality of items to identify a subset of the items as candidate items for optimized selection of informational content elements;
send respective notifications of the candidate items, via one or more programmatic interfaces, to respective entities authorized to provide informational content about the candidate items, and request that the respective entities provide informational content elements for the candidate items for optimized selection of informational content elements;

receive from individual ones of the entities for individual ones of the candidate items, via the one or more programmatic interfaces, (a) a plurality of informational content elements pertaining to individual candidate items and (b) one or more presentation constraints associated with the individual candidate items, wherein the plurality of informational content elements comprises at least a first example and a second example of a particular content element category of a plurality of content element categories, and wherein a particular constraint of the one or more presentation constraints comprises a content portion inclusion constraint;

generate for individual ones of the candidate items, corresponding to individual ones of the plurality of informational content elements, a respective set of input features for a machine learning model; and perform for individual ones of the candidate items a plurality of optimization iterations using the machine learning model, wherein input to the machine learning model comprises one or more of the respective sets of input features, and wherein a particular optimization iteration of the plurality of optimization iterations comprises:

determining, from the plurality of informational content elements in accordance with the one or more presentation constraints, a particular set of informational content elements to be presented to a first target audience in a first presentation context of the one or more presentation contexts, wherein the particular set comprises the first example, and wherein the particular set does not comprise the second example;

providing the particular set of informational content elements to the network-based content provider for subsequent transmission to the first target audience in the first presentation context;

obtaining from the network-based content provider one or more metrics associated with one or more interactions by the first target audience with a presentation of the particular set of informational content elements to the first target audience in the first presentation context; and adjusting, based at least in part on an analysis of the obtained one or more metrics, the particular set of informational content elements to be presented by the network-based content provider in a future iteration; and wherein the one or more computing devices of the network-based content provider are configured to:

present the particular set of informational content elements to the first target audience during the particular optimization iteration; and detect the one or more interactions by the first target audience with the presentation of the particular set of informational content elements.

2. The system as recited in claim 1, wherein the particular set of informational content elements comprises a modified version of a first informational content element obtained from the source, wherein the modified version is generated at the artificial intelligence service using one or more additional machine learning models.

3. The system as recited in claim 1, wherein the source associated with the particular item comprises a producer or author of the particular item.

4. The system as recited in claim 1, wherein the machine learning model comprises a bandit model.

5. The system as recited in claim 1, wherein the particular set of informational content elements comprises informational content elements of the plurality of content element categories including a first category and a second category, wherein the one or more computing devices are configured to:

determine, after a second particular optimization iteration of the plurality of optimization iterations, that (a) further exploration of examples of the first category is not to be performed and (b) further exploration of examples of the second category is to be performed;

include, in a set of informational content elements presented in one optimization iteration after the second particular optimization iteration, the first example of the first category and a first example of the second category; and include, in a set of informational content elements presented in another optimization iteration after the second particular optimization iteration, the first example of the first category and a second example of the second category.

6. A method, comprising:

performing, by one or more computing devices of an artificial intelligence service:

classifying a plurality of items to identify a subset of the items as candidate items for optimized selection of informational content elements;

sending respective notifications of the candidate items to respective entities authorized to provide informational content about the candidate items, and requesting that the respective entities provide informational content elements for the candidate items for optimized presentation of informational content elements;

receiving from individual ones of the entities for individual ones of the candidate items (a) a plurality of informational content elements pertaining to individual candidate items and (b) one or more presentation constraints associated with the individual candidate items, wherein a particular constraint of the one or more presentation constraints comprises a content portion inclusion constraint; and performing for individual ones of the candidate items a plurality of optimization iterations using a machine learning model, wherein a particular optimization iteration of the plurality of optimization iterations comprises:

determining, from the plurality of informational content elements in accordance with the one or more presentation constraints, a particular set of informational content elements to be presented to a first target audience in a first presentation context;

providing the particular set of informational content elements to a network-based content provider for subsequent transmission to the first target audience in the first presentation context;

obtaining from the network-based content provider one or more metrics associated with one or more interactions by the first target audience with a presentation of the particular set of informational content elements to the first target audience in the first presentation context; and adjusting, based at least in part on an analysis of the obtained one or more metrics, the particular set of informational content elements to be presented by the network-based content provider in a future iteration; and performing, by one or more other computing devices of the network-based content provider:
presenting the particular set of informational content elements to the first target audience in the first presentation context during the particular optimization iteration; and
detecting the one or more interactions by the first target audience with the presentation of the particular set of informational content elements.

7. The method as recited in claim 6, wherein the particular set of informational content elements comprises a modified version of a first informational content element obtained from the source.

8. The method as recited in claim 6, wherein the source associated with the particular item comprises a producer or author of the particular item.

9. The method as recited in claim 6, wherein another optimization iteration of the plurality of optimization iterations comprises:
analyzing an indication of negative feedback pertaining to at least informational content element; and
determining, based at least in part on a result of analyzing the negative feedback, a modified set of informational content elements to be presented to the target audience.

10. The method as recited in claim 9, wherein the indication of negative feedback comprises one or more of: (a) a review of the particular item, (b) a record of a return transaction associated with the particular item, or (c) a count of a particular type of interaction with potential item consumers, wherein the count is below a threshold.

11. The method as recited in claim 6, wherein the machine learning model comprises a bandit model.

12. The method as recited in claim 6, further comprising performing, by the one or more computing devices:
selecting, from a plurality of optimization granularities comprising an individual-level granularity, a group granularity, and a global granularity, a particular optimization granularity at which presentation of informational content items is to be optimized for the particular item, wherein the first target audience is selected based at least in part on the particular optimization granularity.

13. The method as recited in claim 6, wherein the first presentation context comprises one or more of: a recommendation context, a search context, an item comparison context, an item overview context, or an item details context.

14. The method as recited in claim 6, wherein a first member of the particular set of informational content elements comprises one or more of: (a) an image, (b) a collection of text, (c) a video, or (d) an audio recording.

15. The method as recited in claim 6, wherein the one or more metrics comprise one or more of: (a) a web link click metric, (b) a sales metric, (c) a cart insertion metric, (d) a wish list insertion metric, or (e) a session engagement length metric.

16. A non-transitory computer-accessible storage medium storing program instructions that when executed on one or more processors cause the one or more processors to:
classify a plurality of items to identify a subset of the items as candidate items for optimized selection of informational content elements;
send respective notifications of the candidate items to respective entities authorized to provide informational content about the candidate items, and request that the respective entities provide informational content elements for the candidate items are candidates for optimized presentation of informational content elements;
receive from individual ones of the entities for individual ones of the candidate items (a) a plurality of informational content elements pertaining to individual candidate items and (b) one or more presentation constraints associated with the individual candidate items, wherein a particular constraint of the one or more presentation constraints comprises a content portion inclusion constraint;
perform, by an artificial intelligence service, for individual ones of the candidate items a plurality of optimization iterations using a machine learning model, wherein a particular optimization iteration of the plurality of optimization iterations comprises:
determining, from the plurality of informational content elements in accordance with the one or more presentation constraints, a particular set of informational content elements to be presented to a first target audience in a first presentation context;
providing the particular set of informational content elements to a network-based content provider for subsequent transmission to the first target audience in the first presentation context;
obtaining from the network-based content provider one or more metrics associated with one or more interactions by the first target audience with a presentation of the particular set of informational content elements to the first target audience in the first presentation context; and
adjusting, based at least in part on an analysis of the obtained one or more metrics, the particular set of informational content elements to be presented by the network-based content provider in a future iteration;
present, by the network-based content provider, the particular set of informational content elements to the first target audience in the first presentation context during the particular optimization iteration; and
detect, by the network-based content provider, the one or more interactions by the first target audience with the presentation of the particular set of informational content elements.

17. The non-transitory computer-accessible storage medium as recited in claim 16, wherein the instructions when executed on the one or more processors cause the one or more processors to:
provide, to the individual ones of the entities for the individual ones of the candidate items, an indication of one or more of: (a) a presentation context for which presentation of informational content elements pertaining to the individual ones of the candidate items is to be optimized, or (b) a demographic for which informational content elements are requested.

18. The non-transitory computer-accessible storage medium as recited in claim 16, wherein the particular set of informational content elements comprises a modified version of a first informational content element obtained from the source.

19. The non-transitory computer-accessible storage medium as recited in claim 16, wherein the source associated with the particular item comprises a producer or author of the particular item.

20. The non-transitory computer-accessible storage medium as recited in claim 16, wherein the machine learning model utilizes an exploration-exploitation algorithm.

* * * * *